US012206550B2

(12) United States Patent
Nelson-Gal et al.

(10) Patent No.: US 12,206,550 B2
(45) Date of Patent: Jan. 21, 2025

(54) SYSTEMS AND METHODS OF REMOTELY UPDATING A MULTITUDE OF IP CONNECTED DEVICES

(71) Applicant: Viakoo, Inc., Mountain View, CA (US)

(72) Inventors: David A. Nelson-Gal, Palo Alto, CA (US); Alex B. Sternberg, Forestville, CA (US); Eric L. Green, Newark, CA (US); Maxwell A. Nelson-Gal, Santa Clara, CA (US); Shibani P. Thakkar, Sunnyvale, CA (US)

(73) Assignee: Viakoo, Inc., Mountain View, CA (US)

( * ) Notice: Subject to any disclaimer, the term of this patent is extended or adjusted under 35 U.S.C. 154(b) by 0 days.

(21) Appl. No.: 16/285,478

(22) Filed: Feb. 26, 2019

(65) Prior Publication Data
US 2020/0177444 A1 Jun. 4, 2020

Related U.S. Application Data

(60) Provisional application No. 62/775,166, filed on Dec. 4, 2018.

(51) Int. Cl.
*H04L 41/082* (2022.01)
*G06F 8/656* (2018.01)
(Continued)

(52) U.S. Cl.
CPC ............ *H04L 41/082* (2013.01); *G06F 8/656* (2018.02); *H04L 67/34* (2013.01); *H04L 67/56* (2022.05)

(58) Field of Classification Search
CPC ....... H04L 41/082; H04L 67/28; H04L 67/34; G06F 8/656
See application file for complete search history.

(56) References Cited

U.S. PATENT DOCUMENTS

| 6,233,577 B1 | 5/2001 | Ramasubramani et al. |
| 7,519,504 B2 | 4/2009 | Goldman et al. |

(Continued)

FOREIGN PATENT DOCUMENTS

| WO | 2015/070225 A1 | 5/2015 |
| WO | 2016/076841 A1 | 5/2016 |

OTHER PUBLICATIONS

Wang, et al. (2016). Toward trustworthy crowdsourcing in the social internet of things. IEEE Wireless Communications, 23(5), 30-36. Retrieved from https://ieeexplore.ieee.org/abstract/document/7721739.*

(Continued)

*Primary Examiner* — Boris D Grijalva Lobos
*Assistant Examiner* — Timothy Sowa
(74) *Attorney, Agent, or Firm* — THE MARBURY LAW GROUP, PLLC

(57) ABSTRACT

Various embodiments of the present disclosure include a scalable distributed computing and network system that is configured to update multitude of passive devices in many isolated networks. The system may include a centralized update service (CUS) computing device that receives a firmware file, generates a firmware profile, identifies passive devices that include outdated firmware, select one of the identified passive devices as a test device, and send the firmware file to the test device through intermediates and proxy agents. The CUS computing device receives feedback from the test device, generates a trust score for the firmware file based on the received feedback, and determine whether to send the firmware file to the other identified passive devices based on the generated trust score.

20 Claims, 12 Drawing Sheets

(51) Int. Cl.
  *H04L 67/00* (2022.01)
  *H04L 67/56* (2022.01)

(56) References Cited

U.S. PATENT DOCUMENTS

| | | | |
|---|---|---|---|
| 7,523,092 B2 | 4/2009 | Andreev et al. | |
| 8,548,297 B2 | 10/2013 | Pashkevich et al. | |
| 9,456,190 B2 | 9/2016 | Liu et al. | |
| 9,851,980 B1* | 12/2017 | Li | G06F 9/44 |
| 10,009,575 B1 | 6/2018 | Liu et al. | |
| 11,240,043 B1 | 2/2022 | Leblang et al. | |
| 2005/0076204 A1 | 4/2005 | Thornton et al. | |
| 2010/0208064 A1 | 8/2010 | Lu et al. | |
| 2012/0036220 A1* | 2/2012 | Dare | H04L 67/04 709/217 |
| 2013/0024429 A1 | 1/2013 | Raas | |
| 2013/0336627 A1 | 12/2013 | Calvert | |
| 2014/0181504 A1 | 6/2014 | Almahallawy et al. | |
| 2014/0201321 A1* | 7/2014 | Donaghey | H04L 67/34 709/217 |
| 2015/0085115 A1 | 3/2015 | Sternberg et al. | |
| 2016/0291959 A1* | 10/2016 | Searle | H04L 63/10 |
| 2016/0337169 A1* | 11/2016 | Chhabra | H04L 41/0672 |
| 2016/0381030 A1* | 12/2016 | Chillappa | H04W 4/70 726/11 |
| 2018/0109533 A1* | 4/2018 | Thubert | H04L 41/28 |
| 2018/0227391 A1* | 8/2018 | Zimmer | H04L 67/34 |
| 2018/0248749 A1* | 8/2018 | Chou | H04L 67/1051 |
| 2019/0205115 A1* | 7/2019 | Gomes | H04L 67/34 |
| 2019/0215688 A1* | 7/2019 | Zavesky | H04L 63/00 |
| 2019/0250898 A1* | 8/2019 | Yang | H04L 41/082 |
| 2019/0288913 A1* | 9/2019 | Salgueiro | H04L 41/082 |
| 2019/0306242 A1* | 10/2019 | Thummalapalli | H04L 41/20 |
| 2019/0334869 A1* | 10/2019 | Grant | H04L 61/3025 |
| 2019/0391800 A1* | 12/2019 | Lin | H04L 67/34 |
| 2020/0012492 A1* | 1/2020 | Bonar | H04L 67/34 |
| 2020/0059372 A1 | 2/2020 | Goeringer et al. | |
| 2020/0136836 A1 | 4/2020 | Schiattarella et al. | |
| 2021/0377053 A1 | 12/2021 | Mahajan et al. | |

OTHER PUBLICATIONS

Nakagawa, et al., (Jul. 2017). IoT agent platform mechanism with transparent cloud computing framework for improving IoT security. In 2017 IEEE 41st Annual Computer Software and Applications Conference (COMPSAC) (vol. 2, pp. 684-689). IEEE. Retrieved from https://ieeexplore.ieee.org/document/8030012.*

International Search Report and Written Opinion for International Application No. PCT/US2014/65039 mailed Feb. 19, 2015, 17 pages.

Extended European Search Report from the Munich Patent Office issued in related Application No. 21204457.2 1218 dated Feb. 21, 2022.

Communication pursuant to Rules 70(2) and 70a(2) EPC and reference to Rule 39(1) EPC Office Action issued in related Application No. 21204457.2-1218 / 3989483 dated May 3, 2022.

Nelson-Gal, et al., Non-Final Office Action in copending U.S. Appl. No. 17/079,903, dated Oct. 25, 2023.

* cited by examiner

SYSTEMS AND METHODS OF REMOTELY UPDATING A MULTITUDE OF IP CONNECTED DEVICES

RELATED APPLICATIONS

This application claims the benefit of priority to U.S. Provisional Application No. 62/775,166, entitled "Systems and Methods of Remotely Updating a Multitude of IP Connected Devices" filed Dec. 4, 2018, the entire contents of which are hereby incorporated by reference for all purposes.

BACKGROUND

Over the past several years, passive network connected devices (e.g., IP connected cameras, access controllers, sensors, smart-doors, etc.) have become prolific in industrial settings. It is now common for a single entity (e.g., enterprise, organization, corporation, system, etc.) to deploy and maintain many such devices from many different manufacturers in isolated networks that are separate or independent of the wider corporate LAN or WAN. Larger entities may be responsible for maintaining networks in different geographical areas. These characteristics present a number of unique cyber-security and management challenges for the entities. Due to these challenges, many passive devices do not receive proper updates and/or include outdated or incorrect versions of software.

For example, due to their passive nature, passive network connected devices may require that software updates be pushed to them by a controller device that is located within in the same local network as the device being updated. To accomplish this, an operator may be required to manually install a controller device and/or physically access each controller device in each network each time a device needs updates. This can be time consuming and cost prohibitive for larger entities that are responsible for maintaining a large number of passive network connected devices in multiple isolated networks in different geographical areas. Accordingly, improved and more scalable solutions for managing, updating, maintaining, and distributing software to passive network connected devices that are deployed in isolated networks will be beneficial to the entities that deploy and use them.

SUMMARY

The various embodiments include methods of updating software on passive devices included in isolated networks, which may include receiving, via a processor in a centralized update service (CUS) computing device, a firmware file and information identifying at least one make and model of a passive device, generating, by the processor, a firmware profile information element based on the received firmware file, querying, by the processor, a global configuration database to identify passive devices that include outdated firmware and match the identified make and model, selecting, by the processor, at least one of the identified passive devices as a test device, identifying, by the processor, a proxy agent component that is included in the same isolated network as the selected passive device, sending, by the processor, the firmware file to the identified proxy agent component to cause the identified proxy agent component to initiate an update procedure on the selected passive device (in which the sending includes leveraging intermediary agents to support secure communication through isolation layers to proxy agents on isolated networks), receiving, by the processor, feedback from the proxy agent component (the feedback including state transition information indicating whether the update procedure caused the passive device to transition into a succeeded state, a reverted state, or a failed state), generating, by the processor, a trust score for the firmware file based on the received feedback, and determining, by the processor, whether to send the firmware file to the other identified passive devices based on the generated trust score.

In an embodiment, sending the firmware file to the identified proxy agent component to cause the identified proxy agent component to initiate an update procedure on the selected passive device may include leveraging intermediary agents to support secure communication through isolation layers to proxy agent components on isolated networks.

In an embodiment, the methods may further include issuing a single command to securely update a multitude of passive devices in multiple isolated networks in response to determining, based on the generated trust score, that the firmware file should be sent to the other identified passive devices. In an embodiment, issuing the single command to securely update the multitude of passive devices in multiple isolated networks may include sending the single command through multiple layers of network obstacles (e.g., stateless and stateful firewalls, packet filters, specialized industrial protocols, firewalls at various levels of the network reference architectures, firewalls with deep packet inspection, transparent firewalls, intrusion detection systems, etc.).

In some embodiments, the CUS computing device is included as part of a scalable distributed computing and network architecture. In some embodiments, operations of sending the firmware file to the identified proxy agent component, receiving feedback from the proxy agent component, and generating a trust score for the firmware file based on the received feedback include sending the firmware file to one or more proxy agent components to cause a small or select group of passive devices to install the firmware file, receiving separate discrete state transition information messages from each device in the small or select group of passive devices, and generating the trust score based on the received separate discrete state transition information.

In some embodiments, operations of generating a trust score for the firmware file based on the received feedback and determining whether to send the firmware file to the other identified passive devices based on the generated trust score include using network and device security mechanisms along with the social dimension of trust to assure trustworthiness of the firmware file.

Some embodiments may further include determining selection criteria for implementing a policy, retrieving metadata associated with the identified passive devices that include outdated firmware and match the identified make and model, determining based on the determined selection criteria and retrieved metadata whether initiating the update procedure on an identified passive device is consistent with implementing the policy, and forgoing initiating the update procedure on the passive device in response to determining based on the determined selection criteria and retrieved metadata that initiating the update procedure on an identified passive device is not consistent with implementing the policy.

In some embodiments, determining based on the determined selection criteria and retrieved metadata whether initiating the update procedure on an identified passive device is consistent with implementing the policy may include at least one of determining whether the identified passive device is being updated by another task, determining whether two or more identified passive devices are running the same version of software, determining whether the identified passive device has a related or overlapping coverage area as another identified passive device, determining a priority associated with the identified passive device, determining whether the identified passive device is a mission critical device, determining whether two or more identified passive devices are included in the same group or collection of devices, or determining whether two or more identified passive devices are included in conflicting groups or collections of devices.

In some embodiments, forgoing initiating the update procedure on the passive device includes forgoing selecting the identified passive devices as the test device, or forgoing sending the firmware file to the identified proxy agent component. In some embodiments, forgoing initiating the update procedure on the passive device includes the identified proxy agent component forgoing initiating the update procedure on the passive device.

Some embodiments may further include receiving, in the identified proxy agent component, the firmware file, receiving, in the identified proxy agent component, a list of devices to be updated based on the received firmware file, determining based on the determined selection criteria and retrieved metadata whether initiating an update procedure on an identified passive device is consistent with implementing a policy, and forgoing initiating the update procedure on the passive device in response to determining that initiating an update procedure on the identified passive device is not consistent with implementing the policy.

In some embodiments, selecting at least one of the identified passive devices as the test device may include rendering a list of devices on an electronic display associated with the CUS computing device, and receiving user input identifying devices selected as test devices. In some embodiments, selecting at least one of the identified passive devices as the test device may include retrieving metadata identifying at least one of a geographic location of at least one of the identified passive devices, an installation facility of at least one of the identified passive devices, a security requirement of the installation facility, an installation location within the installation facility, a coverage area of at least one of the identified passive devices, a grouping of at least one of the identified passive devices, and a priority of at least one of the identified passive devices, and selecting at least one of the identified passive devices as the test device based on the retrieved metadata.

Some embodiments may further include augmenting the firmware file with instructions for implementing an installation policy, and sending the firmware file to the identified proxy agent component to cause the identified proxy agent component to initiate an update procedure on the selected passive device may include sending the firmware file to the identified proxy agent component to cause the identified proxy agent component to implement the installation policy based on information collected from the passive devices.

Further embodiments may include a device having a processor configured to perform one or more operations of the methods summarized above. Further embodiments may include a non-transitory processor-readable storage medium having stored thereon processor-executable instructions configured to cause a processor of a device to perform operations of the methods summarized above. Further embodiments include a device having means for performing functions of the methods summarized above.

Further embodiments may include a scalable distributed computing system, that includes a first computing system that implements all or portions of a centralized update service (CUS), a second computing system that implements all or portions of an intermediary agent, a third computing system that implements all or portions of a proxy agent, and a passive computing device that is included in an isolated local area network. In some embodiments the first, second, third computing systems may be configured to perform any or all of the operations to update the firmware on the passive device.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
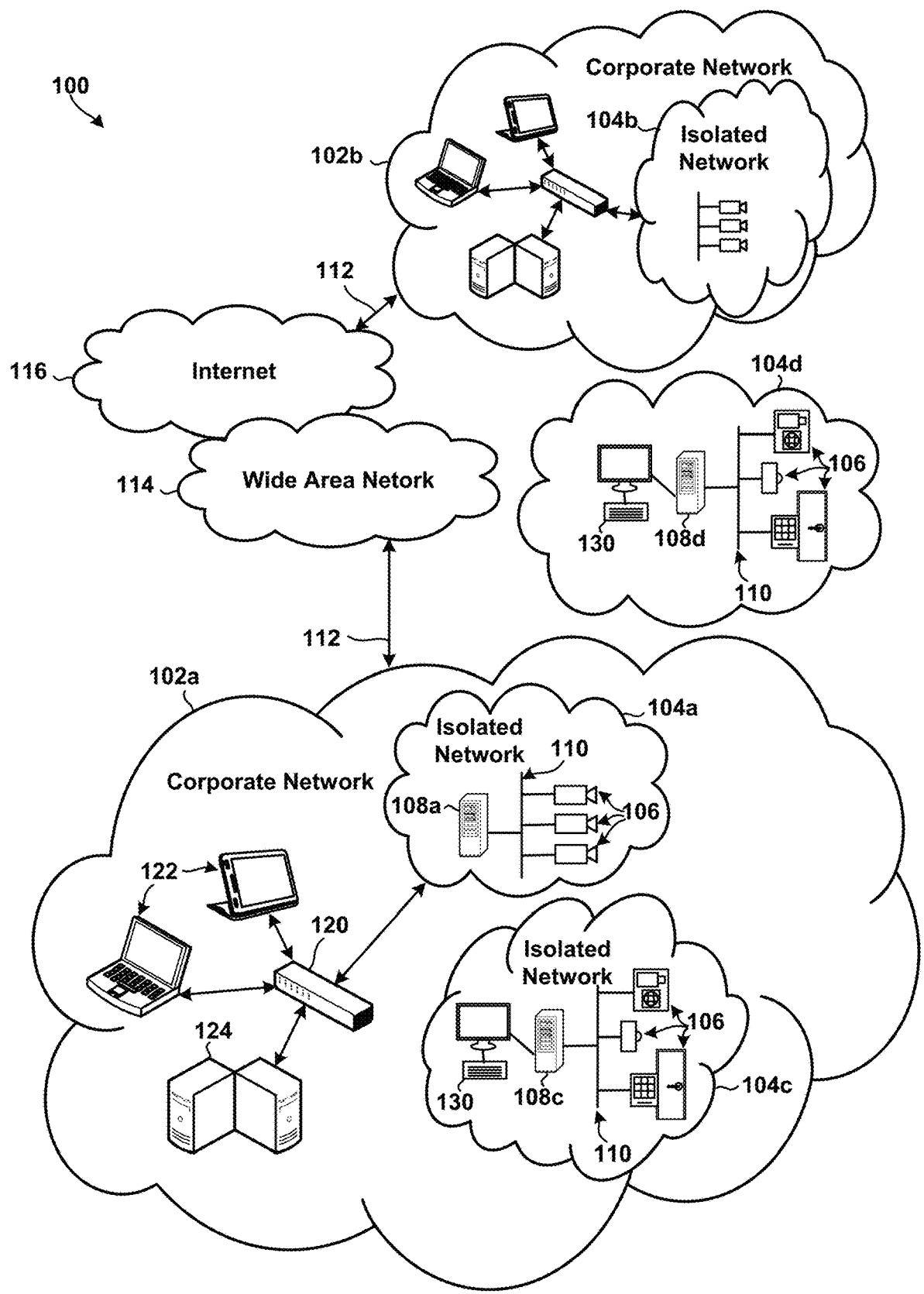
FIG. 1 is a system block diagram conceptually illustrating an example system that includes a multitude of passive devices in isolated networks.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Most conventional computing devices are proactive devices that have network connectivity and access to the Internet. Proactive devices may upgrade their software/firmware by connecting to an application download service, requesting updates, receiving the software/firmware, and installing it on the device. Unlike proactive devices, passive devices do not initiate communications with other devices. Rather, passive devices implement a push communications model in which they only respond to instructions and commands that are pushed to them from a paired or trusted controller device. Accordingly, to upgrade the software/firmware on a passive device, the controller device pushes the software/firmware files and upgrade instructions to the passive device being upgraded.

For applications in which security is important (e.g., surveillance, access control, etc.), passive devices may be included within an isolated network. An isolated network may be an isolated local area network (LAN) in which the devices within the LAN may communicate with one another, but not with devices in other networks (e.g., larger internal network, corporate network, wide area network, Internet, etc.). Including the passive devices in an isolated LAN helps ensure that the passive devices are not subject to malware or cyberattacks, but makes it much more challenging to update and maintain their software/firmware.

To update the software/firmware on passive devices in an isolated network, conventional techniques require that an external component (e.g., controller, etc.) within the isolated network know the current configurations of the devices, determine their access credentials, download a current or upgraded version of firmware/software for each type of device, send the downloaded firmware/software to the devices, and use the correct access credentials to initiate an upgrade procedure on each device. As is discussed in more detail below, these and other conventional techniques for updating passive devices in isolated networks are tedious, cumbersome, inefficient and cost prohibitive for entities that are responsible for updating and maintaining a multitude of passive devices in multiple isolated networks.

The various embodiments overcome the above-mentioned limitations of the conventional techniques via a scalable distributed computing and network architecture that includes a centralized update service (CUS) computing device that is configured to issue a single command that penetrates multiple layers of network obstacles to securely update/upgrade a multitude of passive devices in multiple isolated networks. Some non-limiting examples of such network obstacles include stateless and stateful firewalls, packet filters, specialized industrial protocols, firewalls at various levels of the network reference architectures, firewalls with deep packet inspection, transparent firewalls, intrusion detection systems, dual/multi ported devices (e.g., a server with multiple network connections, etc.) that provide physical links between a private subnet of devices and the broader corporate network, and servers that require a "network proxy" to forward messages between the external facing network and the internal facing network.

In some embodiments, the CUS computing device may be configured to install software/firmware files and updates on a small or select group of devices, receive feedback from those devices (e.g., separate discrete state transition information, etc.), compute or update a trust score or confidence value associated with the software/firmware based on the feedback, and use the trust score/confidence value to determine whether to install the software/firmware files and updates on the multitude of other passive devices.

In some embodiments, the CUS computing device may be configured to establish a chain of trust that not only utilizes traditional network and device security mechanisms, but also utilizes the social dimension of trust to assure the entity of the trustworthiness of the software/firmware files and updates installed on the passive devices.

The term "passive device" is used herein to refer to any electronic device that uses a push-pull communication model to communicate with another device, such as a controller or an access point (including an IoT access point). Generally, passive devices do not initiate communications with other devices, but rather, only respond to instructions and commands that are pushed to them. A passive device may include a processor, memory, and communication circuitry suitable for communicating with the other devices. Examples of passive devices include IP-network connected surveillance cameras, access controllers, sensors, smart-doors, smart doorways, and alarm systems.

The term "isolated network" is used herein to refer to a communication network that includes electronic devices connected in an environment which has limited or no connectivity to devices in other networks or the Internet. Isolated networks are most commonly used to implement a security or surveillance infrastructure.

Growing use of IP network connected devices, also known as "Internet of Things" (IoT), to address problems in enterprises is now leading to situations where an organization may find themselves with collections of thousands or tens of thousands of smart devices installed in geographically distributed locations around the world. Things like surveillance cameras, access controllers, sensors, smart doorways and alarms can be installed over the course of years, purchased by different departments, installed by a broad variety of people with different products purchased with different features and capabilities. These devices implement their functionality through a combination of hardware and software running on these systems. Various $3^{rd}$ party software applications leverage these devices to fulfill a mission such as provide access security for an organization according to centralized rules or 24-hour surveillance of premises for awareness, investigations and regulatory compliance.

Because there are software bugs, evolving requirements, as well as newly discovered cyber vulnerabilities, the software/firmware in these devices when they were installed becomes a liability over time. Vendors of these devices correct problems, improve the software/firmware for these devices and provide ways to distribute these improvements to devices. The challenge is delivering software/firmware to each device that needs an update in a safe and secure manner.

For devices used in industrial applications, because of the nature of their application or environments they are deployed, are passive in that they require a trusted external actor to tell them when and with what software/firmware to update. They provide network application programming interfaces (APIs) using a variety of protocols enabling external utilities to send the device update instructions and software/firmware files.

Vendors of devices create utilities just for this purpose. Because of network isolation, users install these utilities within the local area network of the device so it can find the device and securely give it instructions to update to newer software/firmware versions. Using conventional solutions, a technician must go to each location in their organization with these devices to perform the updates. Furthermore, these utilities only address the particular manufacturer's products and not other vendors' devices.

Some devices may have "phone-home" capabilities to automatically update to the latest software but these devices require open connections through the internet to their parent vendor's website or data center to get the software/firmware updates. This might be okay for many consumer applications but is problematic for many large organizations. Moreover, in a variety of industrial applications, the latest versions of software/firmware from a device vendor maybe incompatible with the $3^{rd}$ party application software that leverages the device to fulfill the organization's goal.

An additional concern is how upgrading some classes of devices can only be done safely through coordination of the associated $3^{rd}$ party application. For example, many video surveillance cameras should not be actively streaming video while an update is being attempted. Therefore, update utilities have a human process of making sure devices are disabled in the application before an update can begin.

In addition, the broad distribution of devices and associated application servers makes it difficult to know which devices are currently vulnerable and need immediate updates. Many times, these devices are not only behind defensive firewalls that prevent active, inbound inspection from wide-area networks (WAN). Moreover, these devices are sometimes in private subnets that are only accessible from the server running the associated $3^{rd}$-party application.

These issues make maintaining correct versions of software in each of these devices a massive effort for large organizations in both resources, time and costs, causing most of this infrastructure to just not get updated, creating risk to both the function and the security of the organization. One industry estimate determined the cost at roughly five hundred US dollars per device to update. Coming up with a safe, reliable mechanism that can scale for massive, distributed infrastructures not only addresses this large organizational risk but can also save significant amounts of money and time.

FIG. 1 illustrates an example system 100 that includes passive network connected devices in isolated networks that are separate and/or independent of the wider corporate LAN or WAN, and which could benefit from the various embodiments. In the example illustrated in FIG. 1, the system 100 includes two independent corporate networks 102a, 102b, both of which may be associated with a single entity (e.g., a corporation, organization, etc.). The corporate networks 102a, 102b may each include communication links 112 to a wide area network (WAN) 114 and/or the wider Internet 116. Each of the corporate networks 102a, 102b may include one or more independent and isolated local area networks (LAN) 104a-c. The entity may also be associated with an isolated LAN 104d that is in remote or hard to access location and/or completely separate and independent from the wider corporate networks 102a, 102b Each of the isolated LANs 104a-d may include one or more passive devices 106. Each of the passive devices 106 may include a processor and communication circuitry for sending and receiving data. The passive devices 106 may be coupled to each other and to an isolated network controller 108 via communication links 110 that form an isolated local area network (LAN). Examples of passive devices 106 include IP connected surveillance cameras, access controllers, sensors, smart-doors, smart doorways, alarm systems, etc. An isolated LAN 104 may include multiple different types of passive devices 106 (e.g., an access controller and a camera), multiple different models of the same type of passive devices 106, multiple different software/firmware versions on the same type or model of device, etc. That is, the passive devices 106 in an isolated LAN 104 may be heterogenous.

Some of the isolated LANs 104a may include communication links to a switch, router, or controller 120 that is within the broader corporate network 102a. The switch, router, or controller 120 may include communication links to various client 122 and server computing devices 124 within the broader corporate network 102a. The computing devices 122, 124 could be used to send software updates to the isolated network controller 108a via the local controller 120. The isolated network controller 108a may be configured to receive updates from the local controller 120, and push the software updates to the appropriate passive devices 106 within the isolated LAN 104a.

Some of the isolated LANs 104c may include user interface elements 130 that allow a user to manually configure the isolated network controller 108c with software updates, which are then pushed out to the passive devices 106 within the isolated LAN 104c. These isolated LANs 104 may or may not have direct communication links to a controller 120 within the corporate network 102a, and thus are logically isolated from the wider corporate LAN or WAN.

To update the software/firmware on passive devices 106 in isolated LANs 104, conventional techniques require that an external actor (e.g., a human actor, controller 120, computing device 122, 124, etc.) or a component within the isolated network (e.g., the isolated network controller 108) know the current software and hardware configurations of the passive devices 106, determine their access credentials, download a current or updated version of software/firmware for each type of device, send the downloaded software/firmware to the devices, and use the correct access credentials to initiate an update procedure on each device.

Some of the isolated LANs 104d may be installed in a remote or hard to reach geographic locations and/or or may be physically and logically isolated from the components in the corporate networks 102a and 102b, WAN 114 and/or the Internet 116. For these isolated LANs 104d, a human actor may be required to travel to the physical location in which the passive devices 106 are located, determine the current software and hardware configurations of the passive devices 106, identify the software that should be running on each device, procure or download the identified software, determine the correct access credentials for each device, and manually install the software on each device using the correct access credentials.

The heterogenous and distributed nature of the passive devices 106 and isolated LANs 104 makes the above described update procedures challenging, cumbersome and cost prohibitive. Moreover, because software/firmware updates can also be used as a way of installing malware and viruses in the passive devices 106 for nefarious actors, the above described update procedures should use higher levels of authorization to access update functions of the passive devices 106. In addition, an organization could have a broad variety of different types and models of passive devices 106, with each manufacturer having different APIs. Yet, the above described conventional update procedures do not have the ability to automatically recognize the different devices and leverage the correct drivers.

The various embodiments overcome these and other challenges with using conventional solutions/techniques by deploying a proxy agent within each isolated LAN 104. The proxy agent may be configured to work in conjunction with an intermediate agent and a centralized update service to provide an awareness of a global inventory of devices, including their makes, models and current software/firmware versions, to the entities responsible for maintaining them. The embodiments may be configured to identify the passive devices 106 that require updates, provide a secure and scalable way to initiate updates from a central location across network boundaries, identify different classes of passive devices 106 and support/provide different drivers for each class, store and make available authentication credentials for each passive device 106, and report back to a central location or responsible entity the outcome of the update operations.

Figure 2:
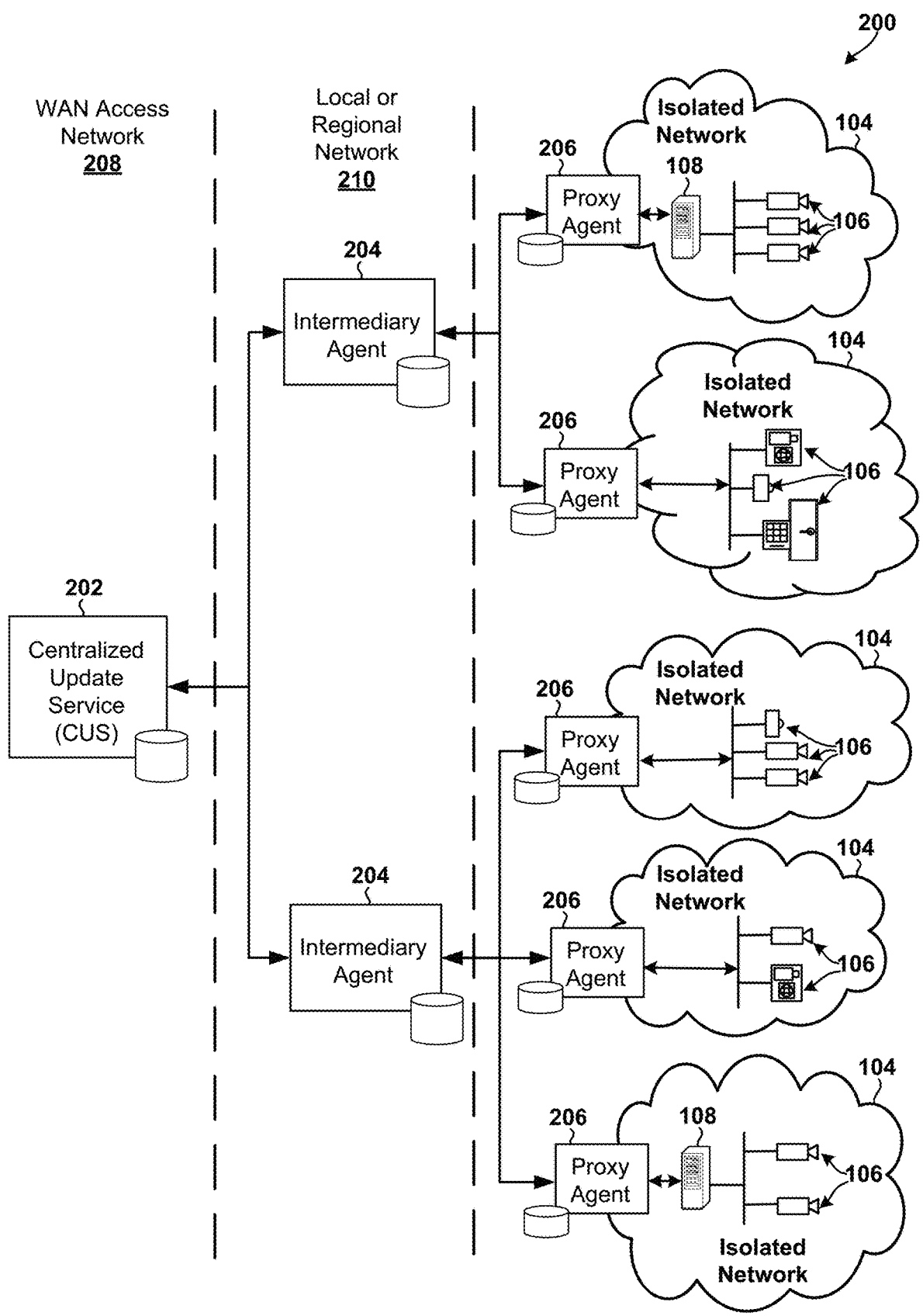
FIG. 2 is a system block diagram illustrating a scalable distributed system suitable for updating and managing a multitude of passive devices in multiple isolated networks in accordance with the various embodiments.

FIG. 2 illustrates a system 200 that includes proxy agents that may be configured to manage and update passive devices in accordance with the embodiments. In the example illustrated in FIG. 2, the system 200 includes a centralized update service (CUS) 202 component, intermediary agent 204 components, and proxy agent 206 components, any or all of which may be implemented in hardware, software, or a combination thereof. The CUS 202 component may be included within a WAN access network 208, the intermediary agent 204 components may be included within local or regional networks 210, and the proxy agent 206 may be coupled to, or included within, an isolated LAN 104 that includes one or more passive devices 106.

A proxy agent 206 may include simultaneous network connectivity to the passive devices 106 in an isolated LAN 104 and to the CUS 202 component in the WAN access network 208. In some embodiments, the proxy agent 206 components may be configured to communicate directly with the passive devices 106. In some embodiments, the proxy agent 206 components may be configured to work in conjunction with an isolated network controller 108 to control, update, maintain, and/or communicate with one or more of the passive devices 106.

The proxy agent 206 may include a local or remote memory or database that stores information identifying the passive devices 106 for which it is responsible, as well as security credentials (i.e., user names and passwords) and device-specific code (drivers) for each of the identified passive devices 106.

In some embodiments, the proxy agent 206 may include (or communicate with a device that includes) one or more driver libraries. These driver libraries may be installed on the proxy agent 206 prior to their deployment and/or downloaded dynamically from the CUS 202. Each driver library may store information that is specific for the potential make and model class of the passive devices 106 at the given location, in an isolated LAN 104, and/or for which the proxy agent 206 is otherwise responsible. To account for the addition and removal of arbitrary devices, the proxy agent 206 may be configured to identify the passive devices 106 that are present in a location or isolated LAN 104, collect information from the identified passive devices 106, and update the information stored in the driver libraries based on the collected information.

In some embodiments, the proxy agent 206 may be configured to receive and store local configuration and authentication information for each passive device 106 from the CUS 202 component. In some embodiments, the proxy agent 206 may store the local configuration and/or authentication information in a local cache memory in a secure or encrypted format.

In various embodiments, the proxy agent 206 may be configured to receive software and instructions from the CUS 202 component (e.g., via an intermediary agent 204 component), access the driver libraries and/or a local cache memory to determine the software or instructions that are to be sent to a passive device 106, push the software/instructions to the passive devices 106 and/or otherwise cause the passive devices 106 to execute various commands, collect information from the passive devices 106, and send the collected information (e.g., status information, firmware version, model, make, etc.) to the CUS 202 component.

The intermediary agent 204 components may provide a communication conduit between the CUS 202 component and the proxy agent 206 components. The communication conduit may allow the CUS 202 component and the proxy agent 206 components to communicate information through layers of networking obstacles, such as layers of firewalls that may include any or all of cloud-based firewalls, ISP firewalls, WAN firewalls, corporate firewalls, LAN firewalls, isolated LAN firewalls, etc. Examples of information that could be communicated between the CUS 202 and proxy agent 206 through firewalls for a passive device 106 include a device IP address, device make, device model, a current software/firmware version, username, password, update status or state information, etc. The intermediary agent 204 component may also support scalability and/or address various special routed network isolation requirements of the proxy agent 206 components and/or the isolated LANs 104 in which they are deployed.

The CUS 202 component may include, or include communication links to a device that includes, a global configuration database. The global configuration database may include information identifying proxy agent 206 components and the passive devices 106 that are local to each identified proxy agent 206. The global configuration database may also store information (e.g., vendor specific information, IP address, device make and model, current software/firmware version, etc.) for each passive device 106. The CUS 202 component may be configured to automatically populate the global configuration database based on information received from the proxy agent 206 components, based on information that is provided manually by a local operator at installation, and/or based on information that is otherwise available on the CUS 202 component.

In some embodiments, the CUS 202 component may be configured to use the information stored in the global configuration database to determine the version of software/firmware that is currently installed on a passive device 106, whether a more current version of the software/firmware is available and/or whether the passive device 106 is are currently running out-of-date software/firmware, and whether the passive device 106 should be updated with a more current version of the software/firmware. The CUS 202 component may determine that the passive device 106 should be updated with a more current version of the software/firmware based on a variety of factors, including the availability updated software/firmware, the device's current hardware or software configuration, the device's vulnerability to malware or cyber-attacks, the device's compliance with security standards, etc.

In response to determining that the passive device 106 should be updated with a more current version of the software/firmware, the CUS 202 component may determine the software/firmware file or version that should be installed in the passive device 106. The CUS 202 component may identify the proxy agent 206 and/or intermediary agent 204 that associated with the passive device 106, and send information identifying the determined software/firmware file or version (or the actual file/code) to the identified proxy agent 206 or intermediary agent 204 to update the passive device 106. In some embodiments, the CUS 202 component may be further configured to identify other passive devices 106 that are similar to the updated passive device 106 (e.g., in terms of make, model, configuration, etc.), identify the proxy agents 206 and/or intermediary agents 204 associated with those devices, and send information identifying the determined software/firmware file or version (or the actual file/code) to those proxy agents 206 or intermediary agent 204 to change software/firmware running on potentially thousands of devices.

In the area of firmware for passive devices, it is important to create a "trustworthy" mechanism so that entities are able to trust it. Trustworthiness might be considered objective properties of a system, such as, how it is designed, the level of defenses against attack, the methods and frameworks used to secure communication, etc. An entity's trust in a system may be more a subjective judgment based on observations and what they might consider important symptoms of safe behavior. For a system to be trusted by an entity, it should not only be trustworthy, but also give feedback that helps the entity believe the system is working correctly and safely.

Generally, entities believe that a solution as being trustworthy if it does what it is supposed to do without failing. More frequently, the sense of trust in a system is also a calibration of how secure it is from bad actors attempting to hijack their systems and data for nefarious purposes. Both of these are important, but there is also a third dimension in these situations, specifically how trustworthy are the software/firmware files themselves.

To secure a system (e.g., the system 200 illustrated in FIG. 2) that has the capacity to change software/firmware running on potentially thousands of devices across a global organization, that system should take greater pains than only locking down access and defending communications. In the various embodiments, in addition to locking down access and defending communications, the system 200 may be equipped with a process that helps ensure that an entity is safe not only from external forces, but also safe from its own mistakes (e.g., mistakes made by a human network administrator, etc.).

By deploying and using the CUS 202 component and proxy agent 206 components, the system 200 illustrated in FIG. 2 is generally well equipped to defend the passive devices 106 from external cyber-attacks. However, if an administrative user supplies an incorrect file for a different model of device, an incorrect version, or a corrupted file to update a passive device, then that firmware file could be the one used to update all such devices in the network. To protect against such mistakes and errors, various embodiments may be configured to ensure the trustworthiness of the software/firmware files themselves prior to sending/identifying them to a multitude of proxy agent 206 components and passive devices 106. In some embodiments, the CUS 202 component and proxy agent 206 components may be configured to determine the trustworthiness of a software/firmware file (or an objective trustworthiness property) by installing the file on select devices, monitoring state changes in the selected devices, and verifying the correct operation of the selected devices based on the state changes. In some embodiments, the CUS 202 component may be configured to send the software/firmware file to additional devices only when the software/firmware file is determined to be trustworthy. In some embodiments, the proxy agent 206 components may be configured to only install software/firmware files that have been determined trustworthy.

Figure 3:
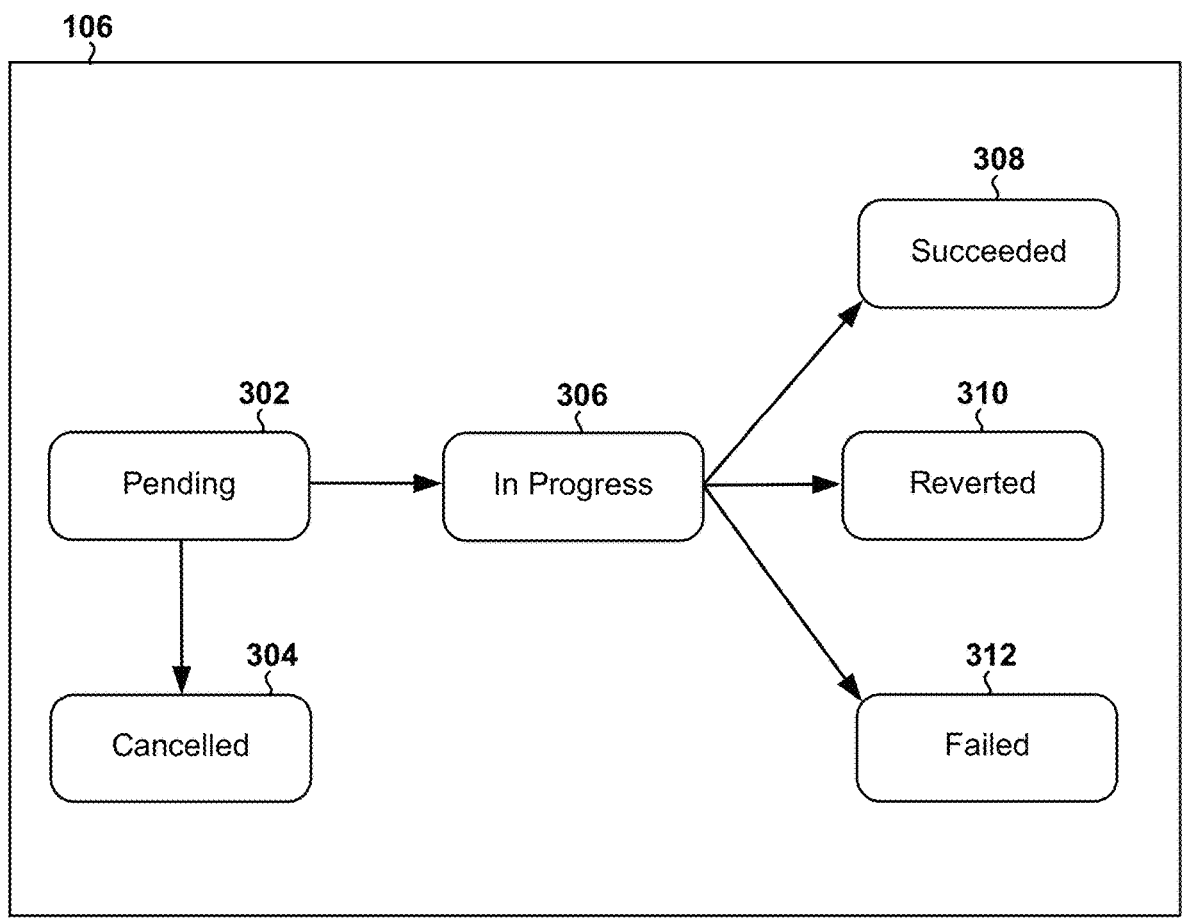
FIG. 3 is a state transition diagram illustrating various states of a passive device configured to implement the various embodiments.

FIG. 3 illustrates the device transition states that could be used to establish an objective trustworthiness property that could be used by a the CUS or proxy agent when determining whether to install a software update in accordance with the embodiments. In the example illustrated in FIG. 3, the device transition states include a pending 302 state, a cancelled 304 state, an in progress 306 state, a succeeded 308 state, a reverted 310 state, and a failed 312 state.

A passive device may enter the pending 302 state when an update job including the device has been submitted (e.g., an update command with a new firmware file been received from a proxy agent), but the update of that particular device has not yet started.

A passive device may enter the cancelled 304 state when an update job including the device has been submitted, but a user, entity or component cancels the update job before the update process begins.

A passive device may enter the in progress 306 state when an update job including the device has been submitted, the update of that particular device has begun, but the update has not yet been completed.

A passive device may enter the succeeded 308 state when the update of that particular device has completed successfully, the device is functioning properly, the device is running the new version of firmware, and the device determines that the new version is not same as the previous version.

A passive device may enter the reverted 310 state when the update of that particular device has completed, but the device determines that it is running the same version of the software/firmware as it was running before. This may happen for a variety of reasons ranging from it failed to start because it didn't have the correct authentication credentials, to the firmware file it was given happened to be the same version of firmware it was already running, to the device detected a problem in the firmware file and reverted back to the version it was running before.

A passive device may enter the failed 312 state if, after entering the in progress 306 state, the update process times out, the device stops functioning properly or, in any other form, does not return to a proper working state.

The succeeded 308 state, reverted 310 state, and the failed 312 state reflect the outcome of a completed update process. Because the reverted 310 state can have many causes, this state does not assert much about the firmware file that was given. The failed 312 state is a negative outcome because it may require manually resetting the device to factory installed configurations, taking the device out of useful service for an extended period of time and creating a lot of work for technicians. The succeeded 308 state is a special condition state that allows the system to assert that the firmware file actually worked and the version stated by the device after the update is truly the version of the firmware file supplied.

Each time a firmware file successfully updates a device of a particular make and model, the system/entity gains additional trust that the file is reliable and safe for more of their device population (e.g., other passive devices for which that system/entity is responsible for maintaining, etc.). As such, the CUS or proxy agent component may increment a trust value (or an objective trustworthiness property value) associated with that firmware file for that make and model of device based on whether the select devices entered the succeeded 308 state, the reverted 310 state, or the failed 312 state. That is, the trust value may be communicated between the CUS and proxy agent components, used by proxy agent components and/or the passive device to determine whether to trust the installation of a file on a particular passive device, and used by the CUS component to determine a particular update is sufficiently trustworthy to distribute to a multitude of other passive devices. As such, the system 200 not only provides secure mechanisms for maintaining and distributing firmware files to passive devices in isolated networks, but also allows the devices and components within the system to make objective determinations of whether to trust a firmware/software file or update.

Figure 4:
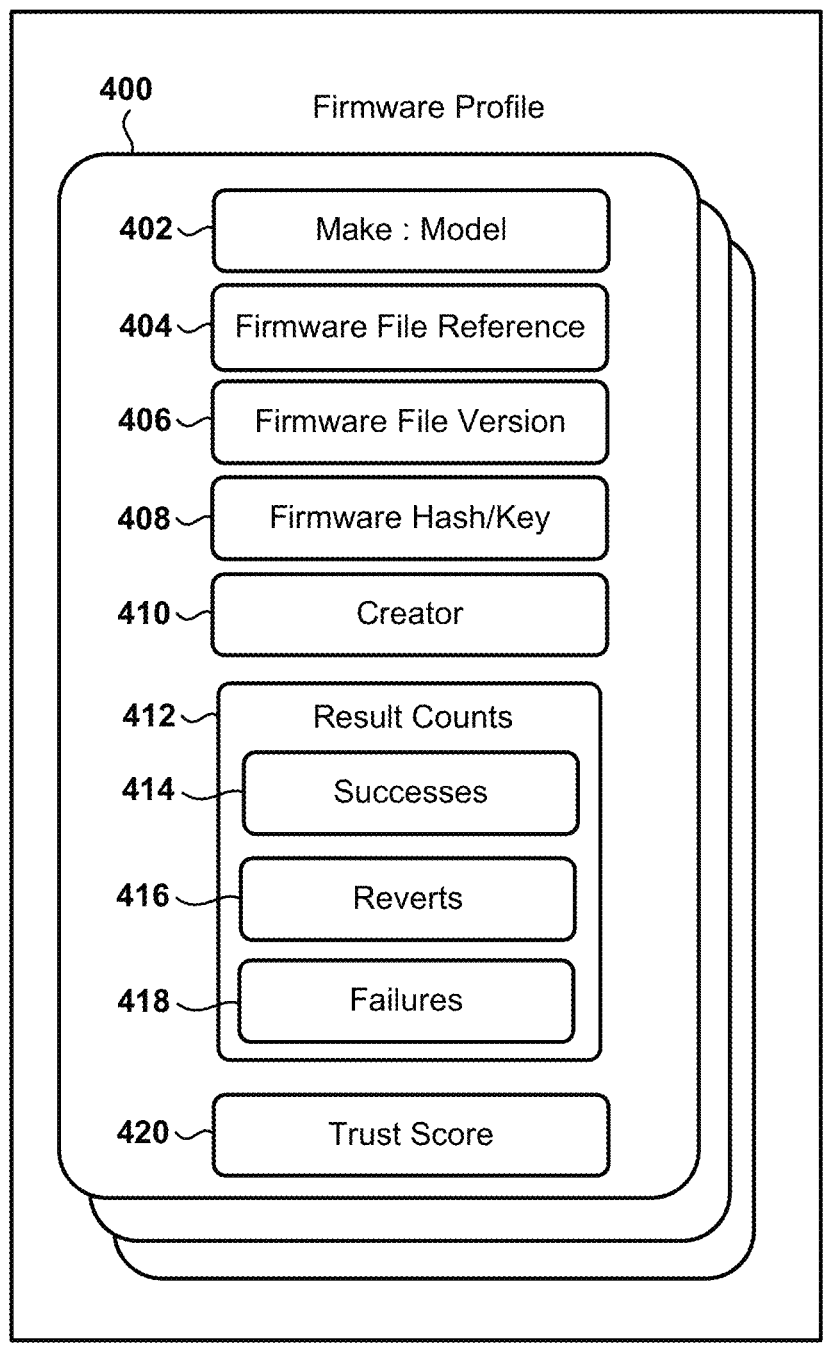
FIG. 4 is an illustration of a firmware profile information element that may be used to establish trust in accordance with some embodiments.

FIG. 4 illustrates an example firmware profile 400 information element (IE) that may be used to establish trust in accordance with some embodiments. In the example illustrated in FIG. 4, the firmware profile 400 IE includes a make-model 402 IE, a firmware file reference 404 IE, a firmware file version 406 IE, a firmware hash/key 408 IE, a creator 410 IE, and a result counts 412 IE that includes a successes 414 IE, a reverts 416 IE, and a failures 418 IE. In some embodiments, the firmware profile 400 IE may also include a trust score 420 IE.

The make-model 402 IE may store information suitable for identifying the make and model of device for which a firmware file (or software update, etc.) is intended.

The firmware file reference 404 IE may include a reference to a firmware file (or software update, etc.), which may be stored in a secure location within a CUS component.

The firmware file version 406 IE may identify the version of the firmware file. In some embodiments, the version may be determined or derived based on the outcome of a successful update.

The firmware hash/key 408 IE may include a hash value, a hash key, and/or a verification key that may be used to validate/verify that the firmware file was not changed during its delivery to the proxy agent components.

The creator 410 IE may include information identifying the user or entity that submitted the file. The creator 410 IE may be used for subsequent audit purposes.

The result counts 412 IE may include various counters and values, and is used to maintain statistics about the number of successful and unsuccessful updates that have occurred for the firmware file via the successes 414 IE, reverts 416 IE, and failures 418 IE.

The trust score 420 IE may include a value that identifies or quantifies the objective trustworthiness property of the firmware file. In some embodiments, the CUS component may compute the value of the trust score 420 IE based on the number of successful updates that have occurred for the firmware file. In some embodiments, the CUS component may compute the value of the trust score 420 IE based on a combination of the values in the successes 414 IE, reverts 416 IE, and failures 418 IE. In some embodiments, the value of the trust score 420 IE may be a probability value between zero and one that identifies the likelihood that the firmware file is safe to install.

With reference to FIGS. 2 and 4, the CUS 202 component may be configured to receive a software/firmware file from a user, entity or system (e.g., file distribution server, etc.). The CUS 202 component may create a firmware profile 400 IE that associates the firmware file with a specific make and model (e.g., via make-model 402 IE), as well as a user, author, or entity (e.g., via creator 410 IE) that created or submitted the firmware file. The CUS 202 component may store the firmware file and/or the firmware profile 400 IE in a secure repository in a form that can be made immutable.

The CUS 202 component may create a unique key (e.g., firmware hash/key 408 IE) that can later be used to verify that the firmware file is unchanged in transport to a proxy agent 206.

The CUS 202 component may send the firmware file and/or all or portions of the firmware profile 400 IE to one or more proxy agents 206. The proxy agents 206 may receive and use the firmware profile 400 IE to cause select passive devices 106 of a specific make and model to install the firmware file and/or perform a corresponding update procedure. The passive devices 106 may perform the update procedure, collect feedback information, and send the feedback (e.g., state transition history information, firmware version information, etc.) to their respective proxy agents 206 for forwarding to the CUS 202 component. The CUS 202 component may receive and use the feedback to update the result counts 412 IE of the firmware profile 400 IE and perform other similar operations.

After the first successful round of updates, the version of the firmware reported by the device(s) becomes bound to the firmware file via the firmware profile 400 IE. The firmware profile 400 IE becomes the collection point for tracking outcomes associated with updates, maintaining counts of the number of times the file successfully updated a device (e.g., via the successes 414 IE, etc.), failed to update but resolved to the original version of firmware (e.g., via the reverts 416 IE), or led to a failed device (e.g., via the failures 418 IE).

The firmware profile 400 IE builds or loses credibility based on its success histories (e.g., value of the successes 414 IE, etc.) with upgrading devices of the associated make and model. In some embodiments, this credibility is quantified and stored via the trust score 420 IE.

In some embodiments, the CUS 202 component may be configured to bind the file to the associated make and model of device and derive a unique a hash (e.g., firmware hash/key 408 IE) or signature for the file. This combination of information, the file, the file hash or signature, the make and the model, create a firmware profile that then becomes the reference for the system for that file. When the file is used in a successful update, the version returned from the device after the successful update gets bound to the profile as well. In this way, the system can assert the following for a supplied firmware file that has successfully updated a device: that the file works for a particular make and model (though the user may choose to perform additional testing to verify that he/she trusts it), and that the file is associated with a specific version.

This firmware profile that associates a make, model, firmware version and file in an immutable way can be used to show that the update can be trusted to a certain degree to have the same effect on other devices of the same make and model.

Further confidence can be gained if the manufacturer signs the firmware file, allowing the system to verify that it came from a trusted source. As such, the CUS component may adjust the value of the trust score to account for whether the manufacturer signed the firmware file.

By making a firmware profile immutable, the specific file can continue to be associated with statistics around success rates, building further insight in its trustworthiness. For example, if it has succeeded in 100 updates but the process reverted to the previous version in 50 attempts and failed in 5 attempts, that may have a different level of "trust" (or trust score) than a firmware profile that has been successful upgrading only 30 devices and reverted or failed in none. This allows the user, entity or system to trust the files they are using to update a broad portfolio, addressing key challenge in managing large environments.

Using conventional solutions, the device management and updating software is local (i.e., within the same subnet) to the device, which allows for simple polling to determine whether the device has successfully upgraded. Utilities (e.g., isolated network controllers, etc.) upgrade a single device directly, monitor its progress, waiting for it to return. Users can tell what is happening because they are directly connected to the device as part of the process.

With a highly scalable device management, updates are remote and maybe done in batches, there needs to be a reliable mechanism to both distribute the firmware to the device as well as communicate back events across the potential hops to the management service. Moreover, because of delays, the management of the process has to be performed somewhat autonomously by the local service since the round-trip to the management service and back to the local agent adds delays and maybe too slow to respond efficiently.

Various embodiments may include a protocol of command and event messages, which allows the CUS component to issue commands and then understand the status of one or many remote, indirectly accessible devices that are in an upgrade job.

In some embodiments, the CUS component may include an Initiate Upgrade Job command, which may be used to commence the update procedure for one or more devices along with the encapsulated firmware file and the verification key.

In some embodiments, the CUS component may include a Halt command, which may be used to cause the proxy agent components to interrupt any passive device that have not yet issued an upgrade command or commenced upgrading their software/firmware.

In some embodiments, the CUS component may be configured to receive various event messages from the proxy agent components. The event messages may include an "Upgrade Successfully Initiated" message, an "Upgrade Failed to Initiate" message, an "Upgrade Successful" message, an "Upgrade Reverted" message, and an "Upgrade Failed" message.

In some embodiments, the CUS component may receive the "Upgrade Successfully Initiated" message from a proxy agent component after a passive device accepts the upgrade command.

In some embodiments, the CUS component may receive the "Upgrade Failed to Initiate" message from a proxy agent component if the upgrade command fails, either due rejected credentials or other failure codes returned from the API call.

In some embodiments, the CUS component may receive the "Upgrade Successful" message from a proxy agent component if the passive device came back online reporting a new (different) version of firmware than it reported before the upgrade.

In some embodiments, the CUS component may receive the "Upgrade Reverted" message from a proxy agent component if the passive device came back online and reported the same version of firmware as it reported before the upgrade.

In some embodiments, the CUS component may receive the "Upgrade Failed" message from a proxy agent component if the passive device was still not responsive after a reasonable amount of time following the upgrade command (i.e., timeout, never came back online, stopped communicating with the proxy agent, etc.).

Though a single Upgrade Job command may include multiple devices, each message may be associated with a single device. In this way, the proxy agent component may track the progress of each individual passive device in a bulk upgrade job. In addition, the CUS component may inform the user the status of each device in an upgrade job.

The CUS component, with its network of intermediate and proxy agents, has a map of all the passive devices under management. From this map, the CUS component may identify all passive devices of a particular make and model, as well as what firmware each device is currently running From the CUS, a user can select a validated firmware profile (i.e., a profile that has been successful at upgrading devices of this make and model before). The user may then select one or more passive devices that warrant an upgrade to the version associated with the selected firmware. The user may launch an upgrade job immediately or schedule the job to run at some point in the future.

The CUS component associates each passive device with a designated proxy agent responsible for upgrading that passive device. This allows the job to naturally be partitioned into groups of passive devices based on the intermediary agents responsible for communication to each proxy agent. The CUS component then partitions a single bulk upgrade job into commands for individual intermediary agent to distribute through the network of intermediary agents. Each intermediary agent, in turn, determines which subordinate intermediary agents or proxy agents are responsible for individual devices in the job.

The protocol for handling a single device allows for the handling of numerous devices within a single network, multiple networks at a given site, or multiple networks across multiple locations in parallel. Each passive device, d, is associated with a proxy agent, PA, and each PA is associated with a site (intermediate agent path), S. A set of devices across a large organization, $d_0 \ldots d_n$, is actually understood as $d_0 \, PA_0 \, S_0 \ldots d_x PA_y \, S_z$, where x is the number of devices, y, is the number of PA's, and z is the number of sites. A bulk upgrade command for a list of devices is given a unique Job Identifier.

So a general command to upgrade $d_0 \ldots d_n$ to firmware F can be translated into a series of commands for each site, S, to direct each PA at this site, to upgrade the list of devices in the overall job that are associated with this PA to the firmware file F.

Event messages coming back to the CUS component for each device upgrade get tagged with the device identifier and job identifier. In this way, the CUS component may associate returning messages for each individual device upgrade to monitor the progress of the overall bulk upgrade job, allowing upgrades to happen in parallel across multiple devices, multiple PAs and multiple jobs.

The above bulk update system may be enhanced in a variety of ways to allow users to force the system to upgrade devices serially (i.e., one at a time across the entire infrastructure), or in parallel (i.e., upgrades are launched simultaneously across devices in the job by the various PAs without waiting for other devices to complete their upgrades) as the policies may be controlled from the CUS component. Because of concerns associated with failures, this mechanism may be enhanced to automatically abort a job after some level of failure has occurred or anytime that the trust score associated with the firmware file falls below a threshold.

Each passive device may be associated with metadata or information structures that identify various attributes or properties of the device, including information such as its geographic location, facility, facility type, facility security level, installation location within the facility, installation position, coverage area, importance, priority, criticality, categorizations, groupings, memberships/collections, dependencies, selection criteria, and other similar information. In some embodiments, the metadata or attribute/property information may be stored in the global configuration database. The CUS component (or bulk update system) may be configured to retrieve and use these attributes/properties of each device to determine, implement, update, enforce or otherwise control various policies that govern the selection of devices as test devices and/or the manner in which the selected devices are to be updated.

Figure 5:
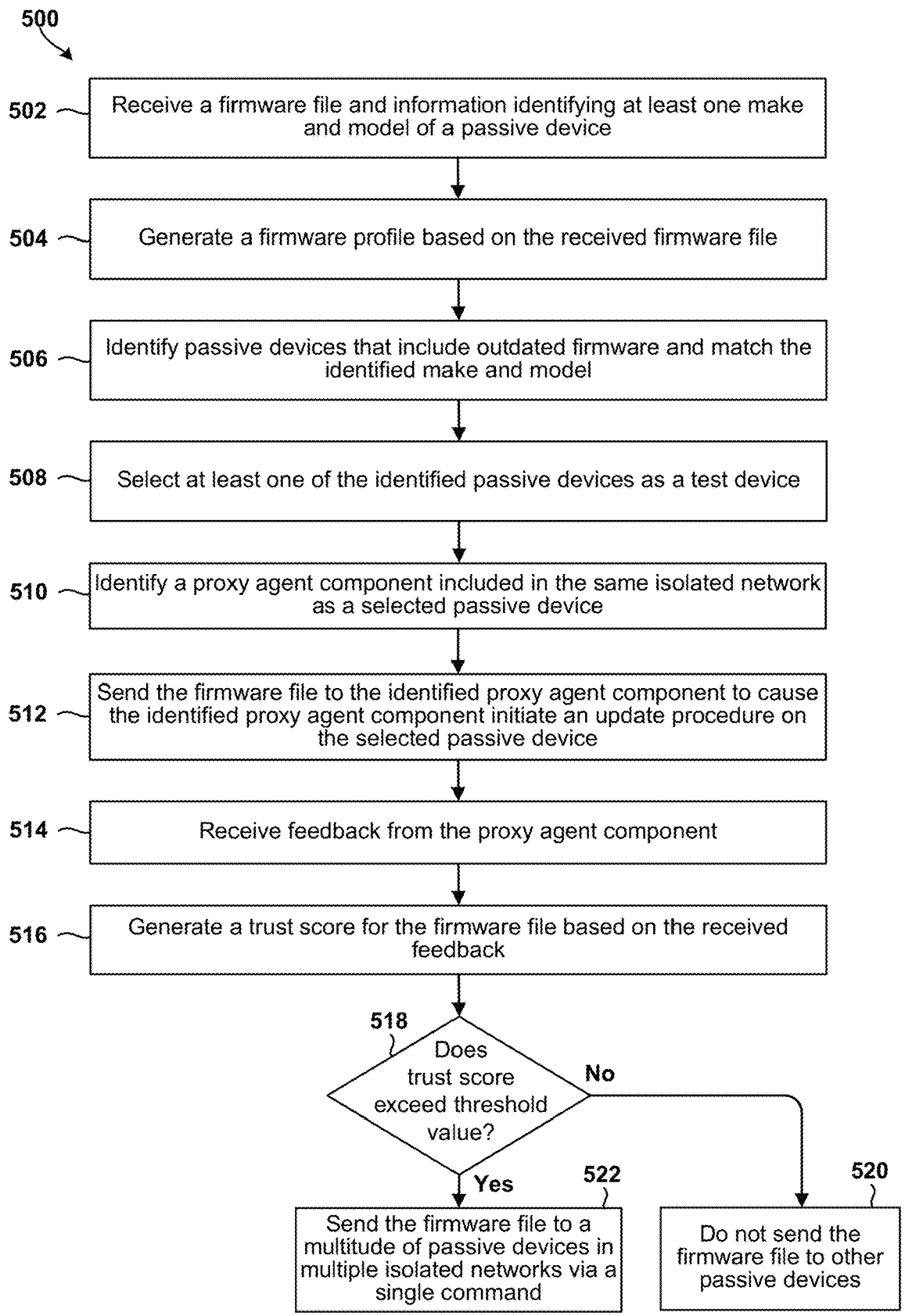
FIGS. 5-10 are process flow diagrams illustrating methods of updating software/firmware on a multitude of passive devices included in multiple isolated networks in accordance with various embodiments.

FIG. 5 illustrates a method 500 of updating software on passive devices included in isolated networks in accordance with an embodiment. Method 500 may be implemented or performed by one or more processors in a computing system that implements all or portions of a CUS component.

In block 502, the processor may receive a firmware file and information identifying at least one make and model of a passive device. In block 504, the processor may generate a firmware profile based on the received firmware file. In block 506, the processor may identify passive devices that include outdated firmware and match the identified make and model. In some embodiments, as part of these operations, the processor may also retrieve metadata identifying various attributes/properties of the identified devices.

In block 508, the processor may select at least one of the identified passive devices as a test device. For example, in block 506 the processor may identify a million devices that have outdated firmware and which could use a software update. Because updating the devices may be disruptive to their operations (e.g., may require devices to go offline, terminate background tasks, restart, etc.), in block 508, the processor may select a small group of these devices to test the install. This allows the processor/CUS component to make sure that the firmware file is not malware and/or will not otherwise cause problems on the device or network before sending the update to all devices.

In some embodiments, in block 508 the processor may select the devices based on priority, policy, metadata and/or user input. For example, the processor may generate a list of identified passive devices, render the list on an electronic display, and receive user inputs identifying the selected devices in block 508.

The processor may also retrieve metadata identifying various attributes/properties of the identified devices, and select one or more of the identified passive devices in block 508 based on the metadata or attributes/properties of the identified devices. As examples, the processor may select a passive device based on metadata identifying its geographic location, installation facility, the security requirements of the installation facility, location within the facility, coverage area, the extent to which their coverage area overlaps with the coverage areas of other devices, grouping, priority, and/or other similar attributes or properties associated with the device.

In addition, the processor may select one or more of the identified passive devices in block 508 based on a policy or rule. For example, a policy may indicate that devices are to be selected based on devices satisfying certain criteria (e.g., is not currently being updated by another job/task, is not running the same version of firmware as another selected test device, is installed a low security facility, is not a mission critical device, etc.). A policy may also govern the selection of devices based on high level objectives, such as to increase diversity of test devices (e.g., by indicating that a highly heterogenous group of devices having significantly different hardware or software configurations should be selected) or reduce the security impact on facilities (e.g., by indicating that devices installed in facilities for which a breach could cause significant damage are not to be selected, that not all devices in a group of devices having overlapping coverage areas are to be selected, etc.). The processor may determine the applicable policy, determine the selection criteria or rules/requirements for implementing the policy, retrieve metadata associated with one of the identified passive devices, compare the retrieved metadata to the determined criteria, rules or requirements, determine based on the results of the comparisons whether selection of the device would be consistent with implementing the policy, and select a device as a test device in response to determining that selection of the device would be consistent with implementing the policy.

In some embodiments, the processor may be configured to select one or more of the identified passive devices in block 508 based on the accessibility of the device (e.g., devices with the fastest network connections, devices with the most secure or reliable communication links, devices within closest physical proximity to the CUS component, devices that can be reached without penetrating multiple layers of firewalls or network obstacles, etc.). In some embodiments, the processor may be configured to select one or more of the identified passive devices in block 508 based on its IP address, hardware/software configuration, whether it is a typical or representative example of the group, installation history (e.g., to make sure that it is a reliable device to use as a test case, etc.), the proxy agent or intermediary agent with which it is associated, or other similar factors.

In block 510, the processor may identify a proxy agent component that is included in the same isolated network as a selected passive device. In some embodiments, this may be accomplished by accessing or querying database tables or records (e.g., in the global configuration database, etc.) that identify the relationships between proxy agent components, isolated networks, and passive devices. In some embodiments, the processor may use a passive device ID associated with the device as a primary lookup key. In some embodiments, the processor may identify the proxy agent component based on the intermediate agent with which it is associated.

In block 512, the processor may send the firmware file to the identified proxy agent component to cause the identified proxy agent component to initiate an update procedure on the selected passive device. In some embodiments, the proxy agent component may be configured to automatically initiate the update procedure on the selected passive device in response to receiving the firmware file. In some embodiments, the processor may annotate the firmware file with instructions for implementing an installation policy (e.g. do not simultaneously update two devices that are categorized into the same group, etc.), and the proxy agent component may be configured to receive and use the instructions/annotations to implement an installation policy. Implementation of the installation policy via the proxy agent components may provide an additional advantage because the proxy agent component is generally better equipped to account for changing conditions, such as another device launching an update job/task (e.g., a group B device, etc.), a device commencing participation in a mission critical operation, a device being moved to a new location within a facility, a device being included to a new collection or group, etc.

In block 514, the processor may receive feedback from the proxy agent component.

In block 516, the processor may generate a trust score for the firmware file based on the received feedback.

In determination block 518, the processor may determine whether the generated trust score exceeds a threshold value.

In response to determining that the generated trust score does not exceed the threshold value (i.e., determination block 518="No"), the processor may determine not to send the firmware file to other passive devices in block 520.

In response to determining that the generated trust score exceeds the threshold value (i.e., determination block 518="Yes"), the processor may determine to send the firmware file to a multitude of passive devices in multiple isolated networks via a single command in block 520. That is, in block 520, the processor may issue a single command to securely update a multitude of passive devices in multiple isolated networks in response to determining, based on the generated trust score, that the firmware file should be sent to the other identified passive devices. In some embodiments, the single command may be sent through multiple layers of network obstacles. The single command may penetrate the multiple layers of network obstacles due to the scalable distributed system (e.g., system 200, etc.) put in place for updating and managing the multitude of passive devices in multiple isolated networks. In some embodiments, the single command may penetrate the multiple layers of network obstacles due to verification and trust information exchanged by the components (e.g., CUS component, proxy agent component, etc.) in advance.

In some embodiments, in block 520, the processor may selectively send the firmware file to the passive devices based on priority, policy, metadata and/or user input. The processor may determine the devices that are to receive the firmware file based on any of the policies or considerations used to select the test devices in block 508 and/or any of the policies/considerations otherwise discussed in this application.

As an example, consider two passive devices that are eligible to receive an update that are security cameras installed on opposing sides of the entrance of a secure facility. The first camera may be positioned to monitor the outside portion of the entrance (e.g., coverage areas A and B, etc.), and the second camera may be positioned to monitor the inside portion of the entrance (e.g., coverage areas B and C, etc.). Since an update/install may be disruptive to operations of the cameras, if the firmware file were sent to both cameras, there could be a period of time in which neither camera is operational. During such time, an unauthorized person could enter or exit the facility without the event being recorded. To address this, in some embodiments, the CUS component may be configured to implement a policy that prevents cameras having an overlapping coverage area (e.g., coverage area B, etc.) from being updated simultaneously. In this example, the system/processor could be configured to determine, based on the metadata associated with the devices, that the two cameras have related or overlapping coverage areas (e.g., coverage area B, etc.), and in response selectively send the firmware file to only one of the cameras. After a certain time period or after receiving confirmation that the select camera was successfully updated, the system/processor could send the firmware file to the other camera to complete its update/install.

As another example, the processor could determine, based on the metadata, that the two or more cameras are categorized into the same group (e.g., entrance, high importance, mission critical, etc.), and selectively send the firmware file to only one of the cameras when the policy precludes updating more than one camera within a group (e.g., the entrance group).

As another example, the processor could determine, based on the metadata, that two or more cameras are categorized into alternative groups (e.g., group A and group B, etc.), that the policy for the alternative groups limits updates to cameras in only one of the groups at a time (e.g., cameras categorized group A should not be updated at the same time as cameras categorized into group B), and selectively send the firmware file to only one of the groups of cameras.

As another example, the processor could determine, based on the metadata, that cameras are categorized into a particular group (e.g., mission critical group, etc.), that the policy specifies that cameras in that group only be updated when other conditions or criteria are satisfied (e.g., on certain days, at certain times, when other devices in the same facility are not being updated, etc.), and send the firmware file to selected ones of the cameras based on whether the other conditions or criteria are satisfied.

In further examples, the policies/rules for upgrading/updating devices may govern the selection of devices: so that all devices that are running the same version of software are updated simultaneously; so that devices being updated by another job/task do not receive the firmware file or initiate the update procedure until the other job/task is complete (i.e., until it is cleared of its current update job); to ensure that the system does not upgrade/update mission critical devices during important events or operations; to ensure that the system does not simultaneously upgrade/update multiple devices in a facility for which a breach could cause significant damage, etc.

In some embodiments, rather than selectively sending the firmware file to the passive devices in block 520, the system/processor may annotate the firmware file with instructions for implementing the policy (e.g. do not simultaneously update two devices that are categorized into the same group, etc.), and send the annotated firmware file to the proxy agent component that implements the policy (e.g., by serially updating devices that are categorized into the same group, etc.). As mentioned above, these embodiments may provide an additional advantage because the proxy agent component could be better equipped to account for or monitor changing conditions.

In some embodiments, the system/processor may be further configured to determine whether the upgrade/update was successful. This may be accomplished via the proxy agent component requesting, receiving, and relaying information identifying the current firmware version of a passive device before and after the upgrade/update installation. The system/processor may compare the information to determine whether the device reverted to the previous version or is running a new version of firmware. This functionality also allows the proxy agent component to send "failed-to-initiate-upgrade/update" messages to differentiate between revert and failure states resulting from an upgrade/update.

In some embodiments, the system/processor may be configured to perform a pre-upgrade/update test to ensure that the device is responsive and/or that the proxy agent component has the correct credentials for the device.

There may be interactions with other applications that are currently using the device for purposes of disabling its use or monitoring activity of the device. For example, a video management service may require that the recording of camera output be disabled before an upgrade/update and then reenabled afterwards. In some embodiments, the system/processor may be configured to pre-empt the application from issuing spurious alerts that the device has failed when it is merely going through an upgrade/update.

Some devices may fail to upgrade/update (e.g., deadlock) if they are being actively used by an application. By intelligently selecting devices for upgrading/updating in accordance with the embodiments discussed above, failures and deadlocks may be prevented by initiating the update/upgrade procedure only when a device is not running an application or performing another upgrade task/job.

Figure 6:
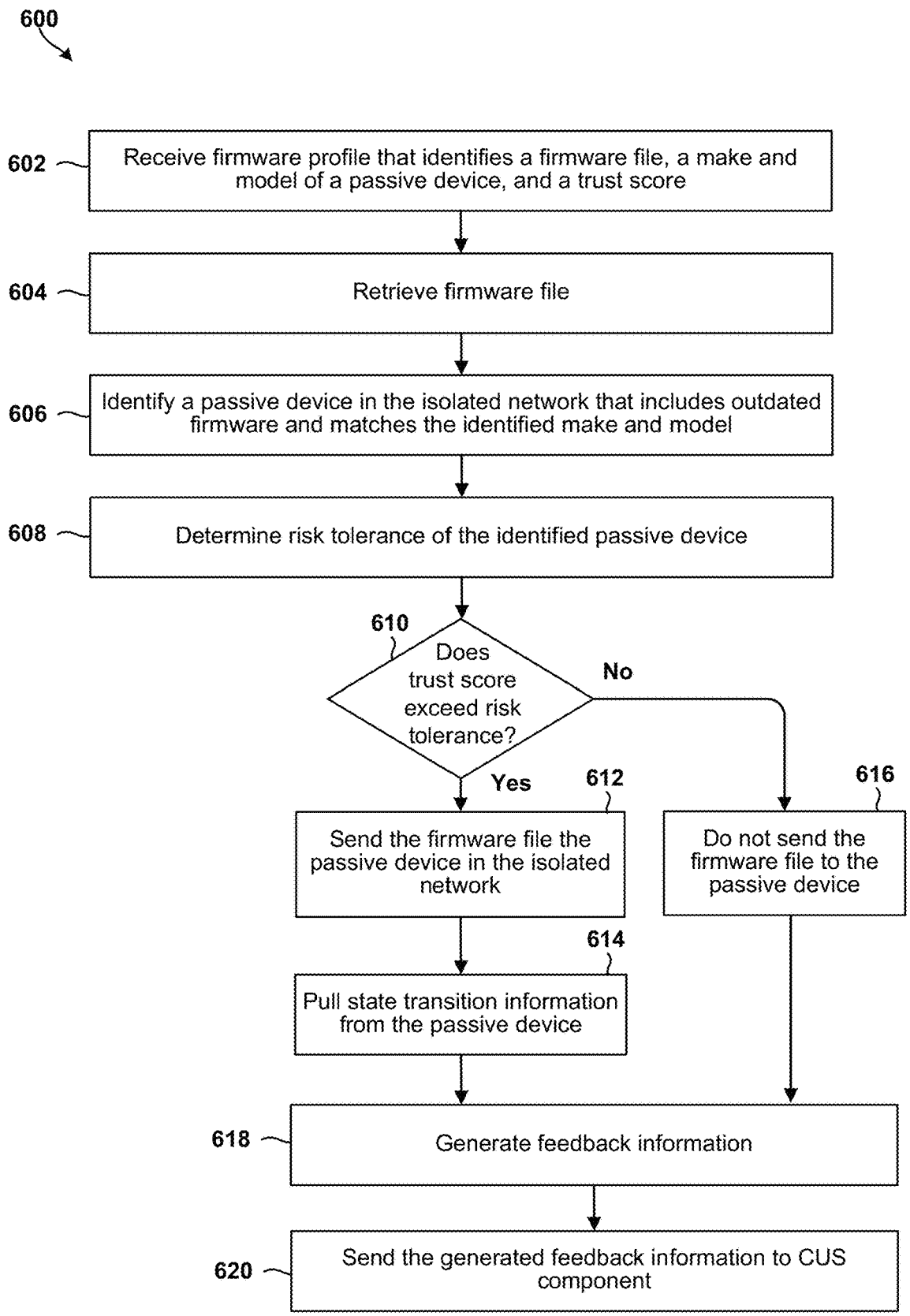

FIG. 6 illustrates a method 600 of updating software on passive devices included in isolated networks in accordance with an embodiment. Method 600 may be implemented or performed by one or more processors in a computing system that implements all or portions of a proxy agent component.

In block 602, the processor may receive firmware profile that identifies a firmware file, a make and model of a passive device, and a trust score.

In block 604, the processor may retrieve the identified firmware file.

In block 606, the processor may identify a passive device in the isolated network that includes outdated firmware and matches the identified make and model.

In block 608, the processor may determine the risk tolerance of the identified passive device.

In determination block 610, the processor may determine whether the received trust score exceeds the determined risk tolerance (e.g., whether the trust score is lower than the tolerance threshold, etc.) of the passive device.

In response to determining that the received trust score exceeds the determined risk tolerance of the passive device (i.e., determination block 610="Yes"), the processor may send the firmware file the passive device in the isolated network in block 612.

In some embodiments, as part of the operations in block 612, the processor may notify one or more devices in the local isolated network that an update procedure will be initiated on the passive device, and that such an update may cause a disturbance. In response, the notified devices may determine that their continued performance will become more important as the passive device is being updated, and enter into a vigilant-active state in which the devices forgo entering into a low power mode and/or do not periodically reduce their operations as part of normal operations. The notified devices may also modify their operations to further reduce the risks associated with any disturbances caused by the performance of the update procedure. For example, if the passive device is a camera that is categorized in entrance group A (e.g., the camera monitors the inside portion of an entrance, etc.), notified devices that are cameras categorized in entrance group B (e.g., cameras that monitor the outside portion of that entrance, etc.) may zoom out, adjust their position, increase their frame capture rate, and/or perform other operations to reduce the risks associated with the passive device going offline to perform an update procedure.

The processor may pull state transition information from the passive device in block 614. In some embodiments, as part of the operations in block 614, the processor may notify the other devices in the local isolated network of the status of the passive device so that they may adjust their operations as needed, such as by exiting the vigilant-active state after the passive device is updated and functioning as expected.

In response to determining that the received trust score does not exceed the determined risk tolerance of the passive device (i.e., determination block 610="No"), the processor may determine to not send the firmware file to the passive device in block 616.

In block 618, the processor may generate feedback information, which may indicate whether the firmware file was sent to the passive device and/or include the state transition information pulled from the passive device.

In block 620, the processor may send the generated feedback information to CUS component. In some embodiments, as part of the operations in block 620, the processor may also notify the other devices in the local isolated network of the status of the passive device so that they may adjust their operations as needed (e.g., exit the vigilant-active state, enter a low power state, etc.).

Figure 7:
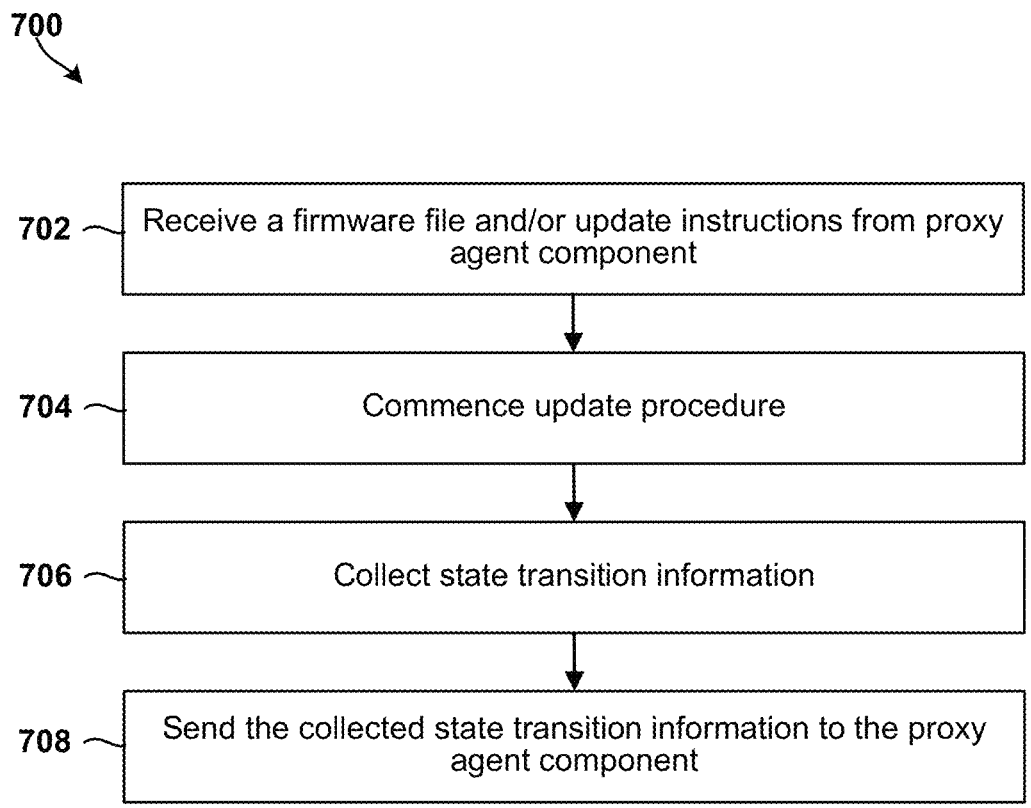

FIG. 7 illustrates a method 700 of updating software on passive devices included in isolated networks in accordance with an embodiment. Method 700 may be implemented or performed by one or more processors in passive device. In block 702, the processor may receive a firmware file and update instructions from proxy agent component. In block 704, the processor may commence running an update procedure on the passive device to update the device's software/firmware. In block 706, the processor may collect state transition information that indicates the various states and conditions on the passive device (e.g., as illustrated and described above with reference to FIG. 3). In block 708, the processor may send the collected state transition information to the proxy agent component for forwarding to the CUS component.

Figure 8:
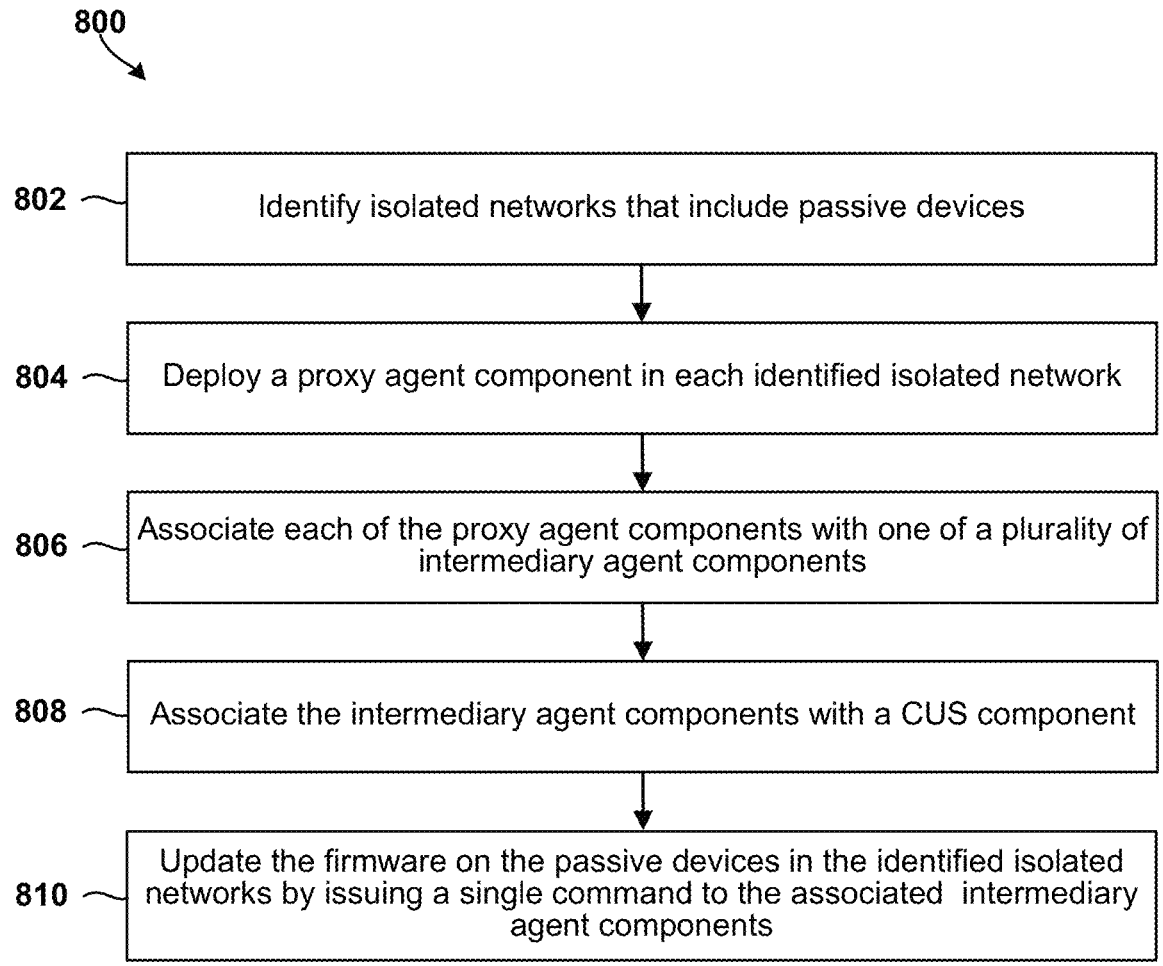

FIG. 8 illustrates a method 800 of creating and using a scalable distributed architecture to update software on passive devices deployed in isolated networks in accordance with an embodiment. All or portions of method 800 may be implemented or performed by one or more processors in one or more computing systems, either individually or in conjunction with another actor.

In block 802, a processor may identify isolated networks that include passive devices.

In block 804, a processor may deploy a proxy agent component in each of the identified isolated networks.

In block 806, a processor may associate each of the proxy agent components with one of a plurality of intermediary agent components.

In block 808, a processor may associate the intermediary agent components with a CUS component.

In block 808, a processor may update the firmware on the passive devices in the identified isolated networks by issuing a single command to the associated intermediary agent components, which send the command to the proxy agent components, which push the command to the passive devices.

Figure 9:
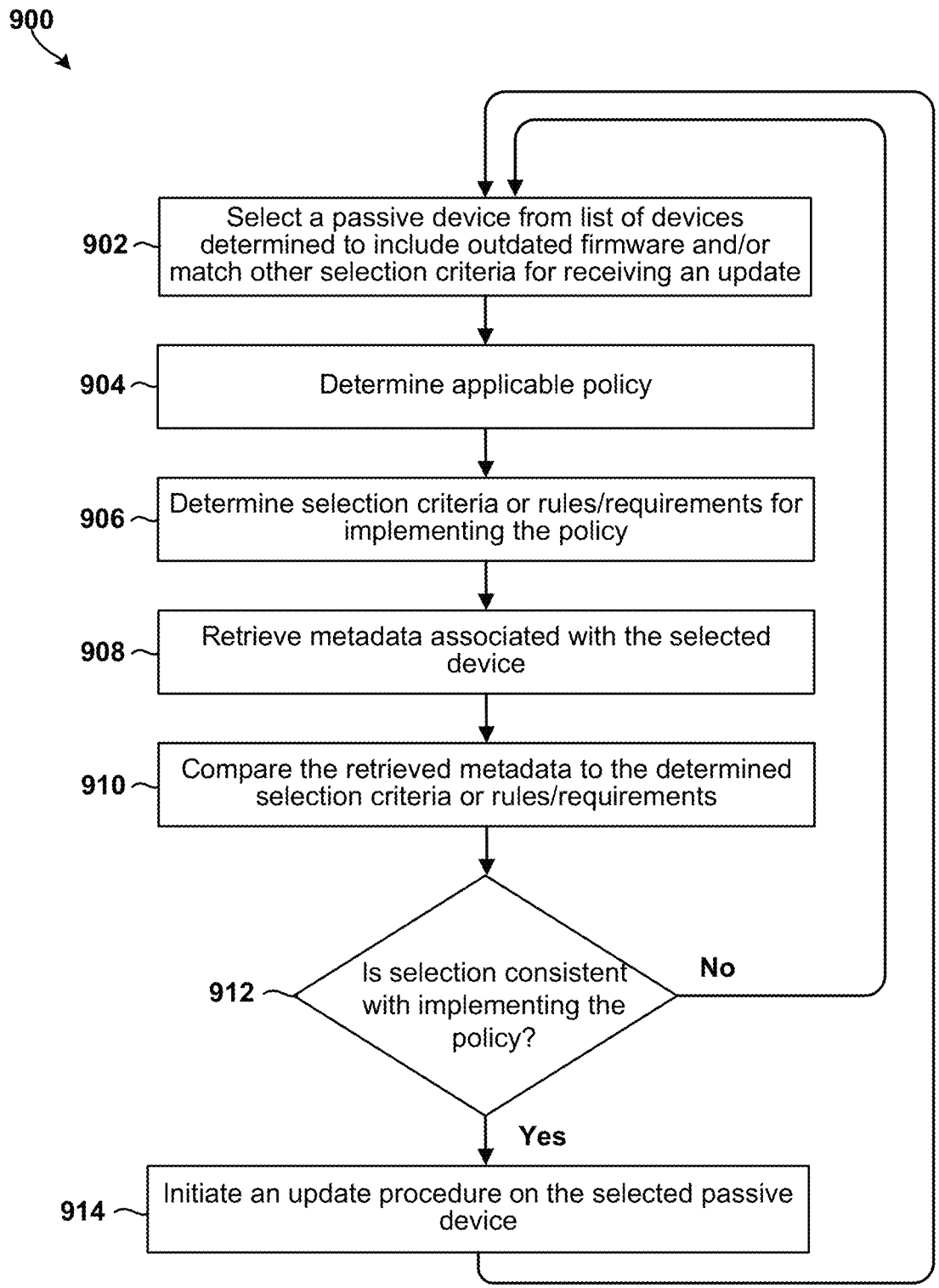

FIG. 9 illustrates a method 900 of updating software on passive devices deployed in isolated networks in accordance with an embodiment. All or portions of method 900 may be implemented or performed by one or more processors in one or more computing systems that implement all or portions of the CUS 202 component, intermediary agent 204 component or proxy agent 206 component.

In block 902, the processor may select the first or next passive device included in a list of devices determined to include outdated firmware and/or match other selection criteria for receiving a software update.

In block 904, the processor may determine an applicable policy for implementing the update. For example, the processor may determine that the applicable policy is to reduce the security impact on the facility, to install the update on a diverse group of devices, to not leave significant gaps in coverage areas, to not simultaneously update two devices running the same version of firmware, etc. In some embodiments, the processor may determine the applicable policy or policies based on the data stored in the global configuration database, such as the importance or criticality of the software update, the number of devices that are to receive the update, the security requirements of the facility, the number of different versions of software running on the passive devices, etc.

In block 906, the processor may determine the selection criteria or rules/requirements for implementing the determined policy.

In block 908, the processor may retrieve metadata associated with the selected device.

In block 910, the processor may compare the retrieved metadata to the determined selection criteria or rules/requirements to generate analysis results.

In determination block 912, the processor may determine, based on the generated analysis results, whether the selection of the device for receiving the update is consistent with implementing the policy. For example, if the policy is to reduce the security impact on the facility, the processor may identify other devices in the facility that are to receive an update, and determine whether upgrading the device in conjunction with the other devices could create a significant security gap or vulnerability at the facility in determination block 912.

As a further example, the policy may require that certain devices not perform the firmware/software updates at the same or overlapping times. For instance, two passive devices that are to receive updates (e.g., as part of the operations in blocks 508-512 or block 522, etc.) may be motion sensor installed on opposite sides of an entrance to a secure facility. The motion sensor (Device A) may be located/positioned to monitor the outside portion of the entrance, whereas the second motion sensor (Device B) may be located/positioned to monitor the inside portion of the entrance. If these devices perform their update procedures at the same time (or within a close time period), there may be a period during which both motion sensors are non-operational. An unauthorized access during this period may not trigger the expected events or conditions. To prevent this, in some embodiments, the processor may determine that the two motions sensors have related or overlapping roles or coverage areas, or are in the same group (e.g., entrance group, high importance, mission critical, etc.), and determine that simultaneously upgrading both motion sensors could create a security gap or vulnerability at the facility in determination block 912.

The processor may determine that the motions sensors are in different groups (e.g., group A and group B, collection A and collection B, Internal Entrance and External Entrance, etc.), and implement a policy that motions sensors categorized in the first group (e.g., Internal Entrance, etc.) may only be selected as a test device or updated when a sensor categorized in the other group (e.g., External Entrance, etc.) is not selected as a test device or is not being updated. The processor may implement these and other policies discussed in this application based on metadata, attributes, and/or properties associated with the devices.

As another example, the policy may require that no more than an X number of devices in a collection (e.g., collection A, etc.) be updated at a time. In this example, in determination block 912, the processor may use the attributes/properties associated with the passive device (e.g., included as part of the metadata, etc.) to determine that the passive device is included in such a collection, determine the number of devices that are included in the same collection and scheduled to receive an update, and determine that the selection of the device for receiving the update is not consistent with implementing the policy if upgrading the passive device would cause more than an X number of devices in a collection to updated within a short period of time.

Returning to FIG. 9, in response to determining, based on the generated analysis results, that the launching the installation procedure on the selected passive device is consistent with implementing the policy (i.e., determination block 912="Yes"), the processor may initiate the update procedure on the selected passive device in block 914.

In response to determining, based on the generated analysis results, that the launching the installation procedure on the selected passive device is not consistent with implementing the policy (i.e., determination block 912="No"), or after launching the update procedure on the selected passive device in block 914, the processor may forgo initiating the update procedure on the selected device and proceed to select the next passive device included in list of devices in block 902. The operations of method 900 may be performed repeatedly until all the device determined to include outdated firmware are updated.

Figure 10:
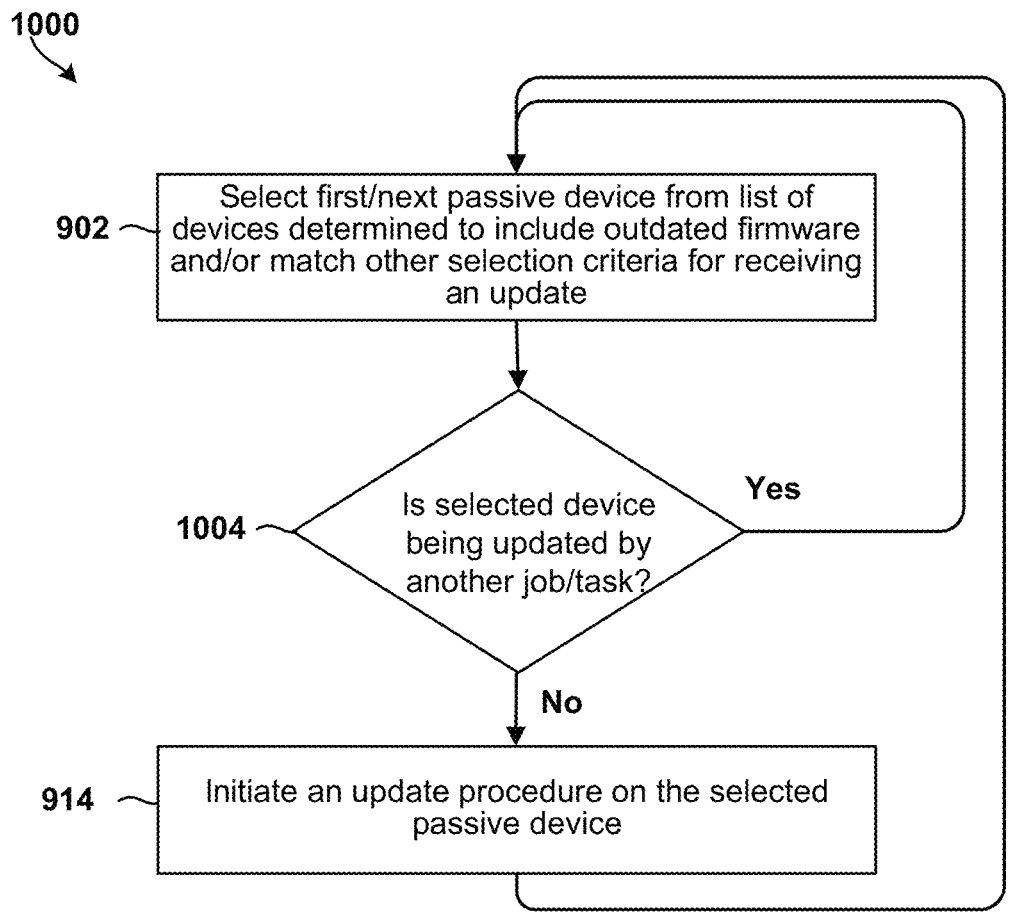

FIG. 10 illustrates a method 1000 of updating software on passive devices deployed in isolated networks in accordance with an embodiment. All or portions of method 1000 may be implemented or performed by one or more processors in one or more computing systems that implement all or portions of the CUS 202 component, intermediary agent 204 component or proxy agent 206 component.

In block 902, the processor may select the first passive device included in list of devices determined to include outdated firmware and/or match other selection criteria for receiving a software update.

In determination block 1004, the processor may determine whether the selected device is currently being updated by another job or task. In response to determining that the selected device is currently being updated by another job or task (i.e., determination block 1004="Yes"), the processor may forgo initiating the update procedure on the selected device and proceed to select the next passive device included in list of devices in block 902.

In response to determining that the selected device is not currently being updated by another job or task (i.e., determination block 1004="Not"), the processor may initiate the update procedure on the selected passive device in block 914. The operations of method 1000 may be performed repeatedly until all the devices included in the list of devices are updated.

In some embodiments, implementation of a policy may alter or change the metadata, attributes/properties of the devices, or other policies. For example, the inclusion of a first device as part of an active upgrade job may not only render other devices ineligible for receiving the same updates, but may cause those devices to perform other operations in support of the update. These other operations may alter the attributes/properties associated with the passive devices, which may impact the policy implication. For example, a change in attributes/properties associated with a passive device may alter the results of the comparisons used to determine the devices should that should perform the installation procedure. In some embodiments, the components may be configured to detect changes to the attributes/properties associated with the passive devices, and respond to the changing conditions (e.g., by regenerating the comparison results with the new data, etc.) to ensure continued compliance with a policy.

Figure 11:
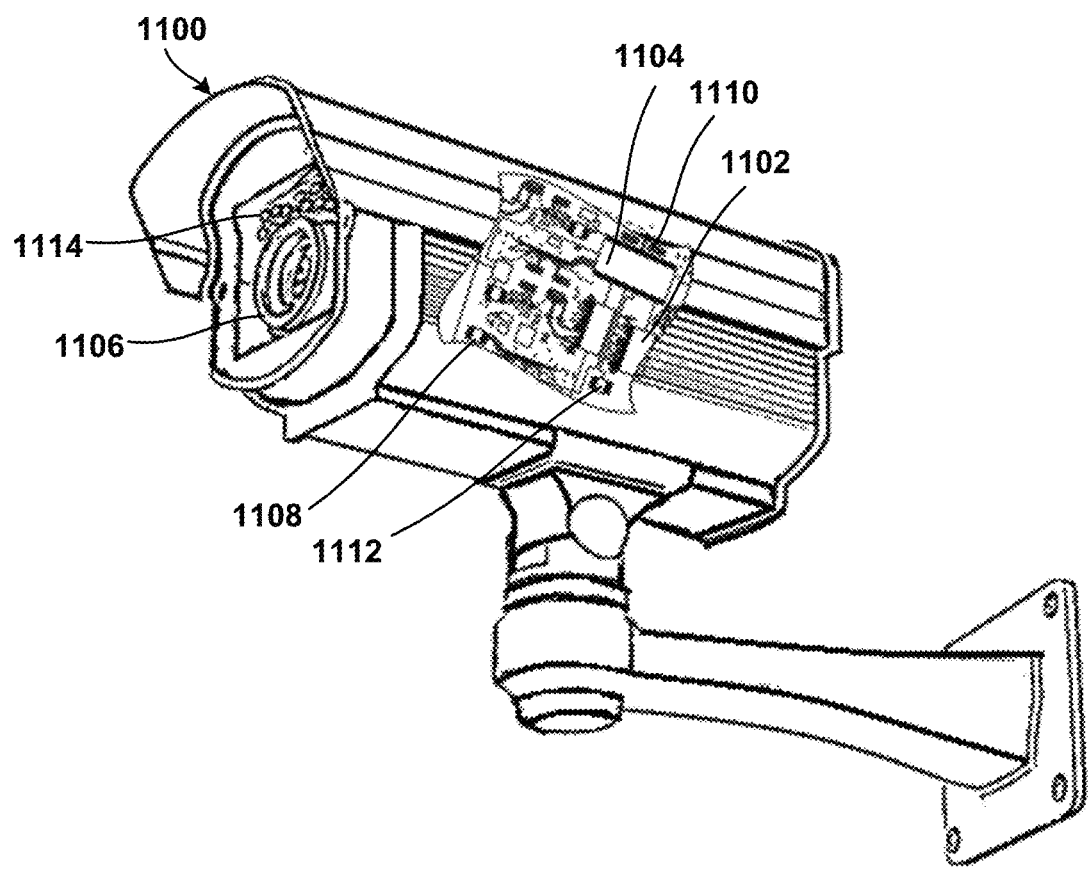
FIG. 11 is a component block diagram of an example passive device that could be updated and maintained in accordance with the various embodiments

A variety of passive devices, an example of which is illustrated in FIG. 11 in the form of a surveillance camera, may implement and benefit from the various embodiments. In the example illustrated in FIG. 11, the surveillance camera 1100 includes a processor 1102 coupled to internal memory 1104, a camera lens 1106, and communication circuitry 1108 suitable for communicating with a controller, access point, router, ethernet hub, etc. in a communication network (e.g., IP network). The surveillance camera 1100 may also include an antenna 1110 for sending and receiving electromagnetic radiation that may be connected to a wireless data link and/or transceiver 1112 coupled to one or more processors 1102. The surveillance camera 1100 may also include a strobe light 1114 that provides uniformly intense, monochromatic illumination of an object captured or photographed by the camera lenses 1106, and selection buttons (not illustrated separately in FIG. 11) for receiving user inputs.

Figure 12:
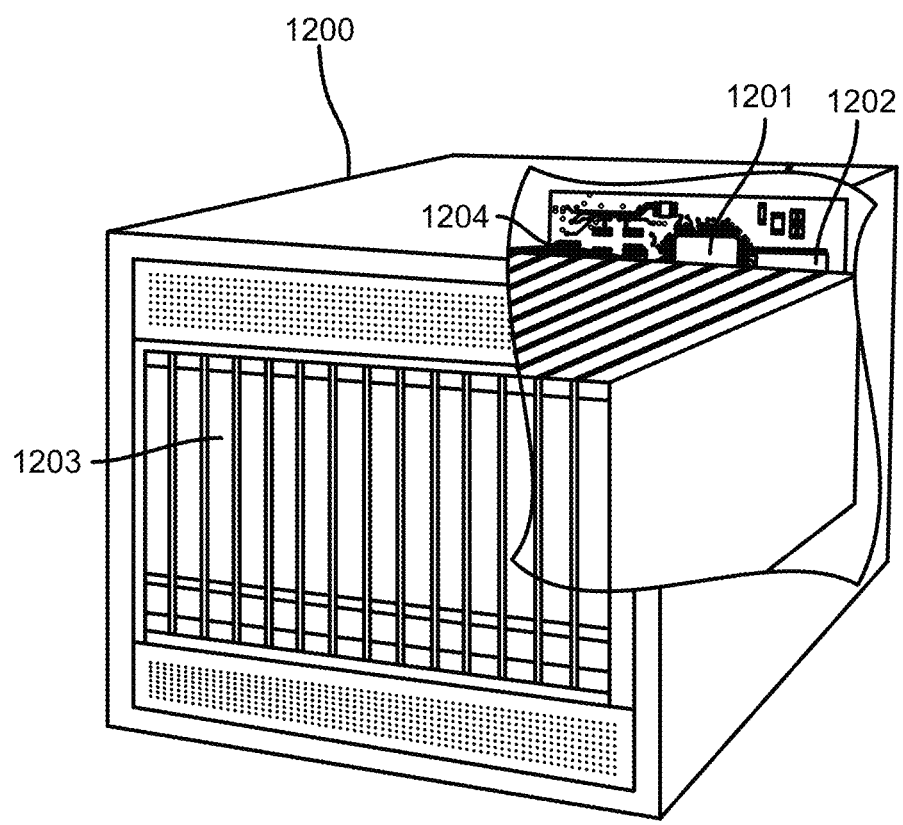
FIG. 12 is a component block diagram of a computing device suitable for implementing the various embodiments.

Some embodiments (e.g., the CUS 202, intermediary agent 204, proxy agent 206, etc.) may be implemented on any of a variety of commercially available computing devices, such as the server computing device 1200 illustrated in FIG. 12. Such a server device 1200 may include a processor 1201 coupled to volatile memory 1202 and a large capacity nonvolatile memory, such as a disk drive 1203. The server device 1200 may also include a floppy disc drive, USB, compact disc (CD) or DVD disc drive coupled to the processor 1201. The server device 1200 may also include network access ports 1204 coupled to the processor 1201 for establishing data connections with a network connection circuit 1205 and a communication network (e.g., IP network) coupled to other communication system network elements.

The processors may be any programmable microprocessor, microcomputer or multiple processor chip or chips that can be configured by software instructions (applications) to perform a variety of functions, including the functions of the various embodiments described in this application. In some wireless devices, multiple processors may be provided, such as one processor dedicated to wireless communication functions and one processor dedicated to running other applications. Typically, software applications may be stored in the internal memory 1104 before they are accessed and loaded into the processor. The processor may include internal memory sufficient to store the application software instructions.

As used in this application, the terms "component," "agent," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WIMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given aspect are not necessarily limited to the associated aspect and may be used or combined with other embodiments that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and BLU-RAY DISC where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of updating software on passive devices on an isolated network, the method comprising:
   receiving, via a processor in a centralized update service (CUS) computing device, a firmware file and information identifying at least one make and firmware version of the passive devices, wherein the passive devices do not initiate communications with other devices;
   querying, by the processor, a global configuration database to identify the passive devices that match the identified make and have outdated firmware;
   selecting, from the identified passive devices, a test group of identified passive devices that include different models and different hardware and software configurations;
   generating an updated test group by updating the test group to exclude the identified passive devices in the test group associated with changing conditions;
   selecting from the updated test group a test passive device that matches the identified make and has outdated firmware;
   querying, using a passive device identifier (ID) as a primary lookup key, the global configuration database that stores information identifying relationships between the passive devices, isolated networks, and proxy agent components to retrieve a database record that identifies a proxy agent component that is included in a particular isolated network together with the selected test passive device;
   sending, by the processor, the firmware file to the identified proxy agent component to cause the identified proxy agent component to initiate an update procedure on the selected test passive device;
   receiving, by the processor, feedback from the proxy agent component, the feedback including state transition information indicating whether the update procedure caused the selected test passive device to transition into a succeeded state, a reverted state, or a failed state;
   generating, by the processor, a trust score for the firmware file based on the feedback received from the proxy agent component; and
   determining, by the processor and based on the generated trust score, whether to send the firmware file to other identified passive devices.

2. The method of claim 1, wherein sending the firmware file to the identified proxy agent component to cause the identified proxy agent component to initiate the update procedure on the selected test passive device includes supporting secure communication through isolation layers via intermediary agents to proxy agent components on isolated networks.

3. The method of claim 1, further comprising issuing a single command to securely update a plurality of passive devices in multiple isolated networks in response to determining, based on the generated trust score, that the firmware file should be sent to other identified passive devices.

4. The method of claim 3, wherein the issuing the single command to securely update the plurality of passive devices in multiple isolated networks comprises sending the single command through multiple layers of network obstacles.

5. The method of claim 1, wherein the CUS computing device is part of a scalable distributed computing and network architecture.

6. The method of claim 1, wherein operations of sending the firmware file to the identified proxy agent component, receiving feedback from the proxy agent component, and generating a trust score for the firmware file based on the feedback received from the proxy agent component comprise:
   sending the firmware file to one or more proxy agent components to cause the updated test group of passive devices to install the firmware file;
   receiving separate discrete state transition information messages from each passive device in the updated test group of passive; and
   generating the trust score based on the received separate discrete state transition information messages.

7. The method of claim 1, further comprising:
   determining selection criteria for implementing a policy;
   retrieving metadata associated with the identified passive devices that include outdated firmware and match the identified make;
   determining based on the determined selection criteria and retrieved metadata whether initiating the update procedure on one of the identified passive devices is consistent with implementing the policy; and
   forgoing initiating the update procedure on the one of the identified passive devices in response to determining based on the determined selection criteria and retrieved metadata that initiating the update procedure on one of the identified passive devices is not consistent with implementing the policy.

8. The method of claim 7, wherein determining based on the determined selection criteria and retrieved metadata whether initiating the update procedure on the one of the identified passive devices is consistent with implementing the policy comprises at least one of:
- determining whether the one of the identified passive devices is being updated by another task;
- determining whether two or more of the identified passive devices are running the same version of software;
- determining whether the one of the identified passive devices has a related or overlapping coverage area as another identified passive device;
- determining a priority associated with the one of the identified passive devices;
- determining whether the one of the identified passive devices is a mission critical device;
- determining whether two or more of the identified passive devices are included in the same group or collection of devices; or
- determining whether two or more of the identified passive devices are included in conflicting groups or collections of devices.

9. The method of claim 8, wherein forgoing initiating the update procedure on the one of the identified passive devices comprises:
- forgoing selecting the one of the identified passive devices as the selected test passive device; or
- forgoing sending the firmware file to the identified proxy agent component.

10. The method of claim 8, wherein forgoing initiating the update procedure on the one of the identified passive devices comprises the identified proxy agent component forgoing initiating the update procedure on the one of the identified passive devices.

11. The method of claim 7, further comprising:
- receiving, in the identified proxy agent component, the firmware file;
- receiving, in the identified proxy agent component, a list of passive devices to be updated based on the received firmware file;
- determining based on the determined selection criteria and retrieved metadata whether initiating an update procedure on the one of the identified passive devices is consistent with implementing the policy; and
- forgoing initiating the update procedure on the one of the passive devices in response to determining that initiating an update procedure on the one of the identified passive devices is not consistent with implementing the policy.

12. The method of claim 1, wherein selecting at least one of the identified passive devices as the selected test passive device comprises:
- rendering a list of passive devices on an electronic display associated with the CUS computing device; and
- receiving user input identifying passive devices selected as test passive devices.

13. The method of claim 1, wherein selecting at least one of the identified passive devices as the test passive device comprises:
- retrieving metadata identifying at least one of:
  - a geographic location of at least one of the identified passive devices;
  - an installation facility of at least one of the identified passive devices;
  - a security requirement of the installation facility;
  - an installation location within the installation facility;
  - a coverage area of at least one of the identified passive devices;
  - a grouping of at least one of the identified passive devices; or
  - a priority of at least one of the identified passive devices; and
- selecting at least one of the identified passive devices as the test passive device based on the retrieved metadata.

14. The method of claim 1, further comprising augmenting the firmware file with instructions for implementing an installation policy, wherein sending the firmware file to the identified proxy agent component to cause the identified proxy agent component to initiate an update procedure on the selected test passive device comprises sending the firmware file to the identified proxy agent component to cause the identified proxy agent component to implement the installation policy based on information collected from the passive devices.

15. A server computing device, comprising:
a processor configured with processor-executable software instructions to perform operations comprising:
- updating software on passive devices on an isolated network by:
  - receiving a firmware file and information identifying at least one make and firmware version of the passive devices, wherein the passive devices do not initiate communications with other devices;
  - querying a global configuration database to identify the passive devices that match the identified make and have outdated firmware;
  - selecting, from the identified passive devices, a test group of identified passive devices that include different models and different hardware and software configurations;
  - generating an updated test group by updating the test group to exclude the identified passive devices in the test group associated with changing conditions;
  - selecting from the updated test group a test passive device that matches the identified make and has outdated firmware;
  - querying, using a passive device identifier (ID) as a primary lookup key, the global configuration database that stores information identifying relationships between the passive devices, isolated networks, and proxy agent components to retrieve a database record that identifies a proxy agent component that is included in a particular isolated network together with the selected test passive device;
  - sending the firmware file to the identified proxy agent component to cause the identified proxy agent component to initiate an update procedure on the selected test passive device;
  - receiving feedback from the proxy agent component, the feedback including state transition information indicating whether the update procedure caused the passive device to transition into a succeeded state, a reverted state, or a failed state;
  - generating a trust score for the firmware file based on the feedback received from the proxy agent component; and
  - determining, based on the generated trust score, whether to send the firmware file to other identified passive devices.

16. The server computing device of claim 15, wherein the processor is configured with processor-executable software instructions to perform operations such that operations of sending the firmware file to the identified proxy agent component, receiving feedback from the proxy agent component, and generating a trust score for the firmware file based on the feedback received from the proxy agent component comprise:

sending the firmware file to one or more proxy agent components to cause a select group of passive devices to install the firmware file;
receiving separate discrete state transition information messages from each passive device in the select group of passive devices; and
generating the trust score based on the received separate discrete state transition information messages.

17. The server computing device of claim 15, wherein the processor is configured with processor-executable software instructions to perform operations further comprising:
   determining selection criteria for implementing a policy;
   retrieving metadata associated with the identified passive devices that include outdated firmware and match the identified make;
   determining based on the determined selection criteria and retrieved metadata whether initiating the update procedure on one of the identified passive devices is consistent with implementing the policy; and
   forgoing initiating the update procedure on the one of the passive devices in response to determining based on the determined selection criteria and retrieved metadata that initiating the update procedure on the one of the identified passive devices is not consistent with implementing the policy.

18. The server computing of claim 15, wherein the processor is configured with processor-executable software instructions to perform operations such that selecting at least one of the identified passive devices as the test passive device comprises:
   selecting at least one of the identified passive devices from the updated test group as the test passive device based on user input identifying passive devices selected as test passive devices; or
   selecting at least one of the identified passive devices from the updated test group as the test passive device based on metadata identifying at least one of a geographic location of at least one of the identified passive devices, an installation facility of at least one of the identified passive devices, a security requirement of the installation facility, an installation location within the installation facility, a coverage area of at least one of the identified passive devices, a grouping of at least one of the identified passive devices, or a priority of at least one of the identified passive devices.

19. A non-transitory processor-readable storage medium having stored thereon processor-executable instructions configured to cause a processor of a server computing device to perform operations for updating software on passive devices on an isolated network, the operations comprising:
   receiving a firmware file and information identifying at least one make and firmware version of the passive devices, wherein the passive devices do not initiate communications with other devices;
   querying a global configuration database to identify the passive devices that include outdated firmware and match the identified make;
   selecting, from the identified passive devices, a test group of identified passive devices that include different models and different hardware and software configurations;
   generating an updated test group by updating the test group to exclude the identified passive devices in the test group associated with changing conditions;
   selecting from the updated test group a test passive device that matches the identified make and has outdated firmware;
   querying, using a passive device identifier (ID) as a primary lookup key, the global configuration database that stores information identifying relationships between the passive devices, isolated networks, and proxy agent components to retrieve a database record that identifies a proxy agent component that is included in a particular isolated network together with the selected test passive device;
   sending the firmware file to the identified proxy agent component to cause the identified proxy agent component to initiate an update procedure on the selected test passive device;
   receiving feedback from the proxy agent component, the feedback including state transition information indicating whether the update procedure caused the selected test passive device to transition into a succeeded state, a reverted state, or a failed state;
   generating a trust score for the firmware file based on the feedback received from the proxy agent component; and
   determining, based on the generated trust score, whether to send the firmware file to other identified passive devices.

20. A method of updating software on passive devices on an isolated network, the method comprising:
   receiving, via a processor in a centralized update service (CUS) computing device, a firmware file and information identifying at least one make and firmware version of passive devices, wherein the passive devices do not initiate communications with other devices;
   querying, by the processor, a global configuration database to identify passive devices that match the identified make and have outdated firmware;
   selecting, from the identified passive devices, a test group of identified passive devices that include different models and different hardware and software configurations;
   generating an updated test group by updating the test group to exclude the identified passive devices in the test group associated with changing conditions;
   selecting from the updated test group a test passive device that matches the identified make and has outdated firmware;
   querying, using a passive device identifier (ID) as a primary lookup key, the global configuration database that stores information identifying relationships between the passive devices, isolated networks, and proxy agent components to retrieve a database record that identifies a proxy agent component that is included in a particular isolated network together with the selected test passive device;
   sending, by the processor, the firmware file to the identified proxy agent component to cause the identified proxy agent component to initiate an update procedure on the selected test passive device;
   receiving, by the processor, feedback from the proxy agent component, the feedback including state transition information indicating whether the update procedure caused the selected test passive device to transition into a succeeded state, a reverted state, or a failed state;
   using, by the processor, network and device security mechanisms along with a social dimension of trust to determine trustworthiness of the firmware file;
   generating, by the processor, a trust score for the firmware file based on the determined trustworthiness of the firmware file and the feedback received from the proxy agent component; and determining, by the processor, whether to send the firmware file to other identified passive devices based on the generated trust score.

* * * * *